US012102910B2

(12) United States Patent
Yu et al.

(10) Patent No.: US 12,102,910 B2
(45) Date of Patent: Oct. 1, 2024

(54) EXERTION-AWARE PATH GENERATION

(71) Applicant: George Mason University, Fairfax, VA (US)

(72) Inventors: Lap-Fai Yu, Falls Church, VA (US); Wanwan Li, Fairfax, VA (US)

(73) Assignee: George Mason University, Fairfax, VA (US)

( * ) Notice: Subject to any disclaimer, the term of this patent is extended or adjusted under 35 U.S.C. 154(b) by 415 days.

(21) Appl. No.: 17/357,367

(22) Filed: Jun. 24, 2021

(65) Prior Publication Data

US 2021/0404826 A1    Dec. 30, 2021

Related U.S. Application Data

(60) Provisional application No. 63/043,397, filed on Jun. 24, 2020.

(51) Int. Cl.
| | |
|---|---|
| *A63F 13/285* | (2014.01) |
| *A63B 24/00* | (2006.01) |
| *A63B 71/06* | (2006.01) |
| *G02B 27/01* | (2006.01) |
| *G06F 3/01* | (2006.01) |
| *G06T 19/00* | (2011.01) |

(52) U.S. Cl.
CPC ............ *A63F 13/285* (2014.09); *G06F 3/011* (2013.01); *G06T 19/006* (2013.01); *A63B 2024/0096* (2013.01); *A63B 2071/0666* (2013.01); *G02B 27/0172* (2013.01)

(58) Field of Classification Search
CPC ...... A63F 13/285; A63F 13/24; A63F 13/422; A63F 13/428; A63F 13/56; A63F 13/58; A63F 13/65; A63F 13/803; G06F 3/011; G06F 3/016; G06T 19/006; A63B 2024/0096; A63B 2071/0666; A63B 2071/0644; A63B 2071/0677; A63B 22/0605; G02B 27/0172; G02B 2027/014
USPC .............................................. 482/5; 345/633
See application file for complete search history.

(56) References Cited

U.S. PATENT DOCUMENTS

| | | | |
|---|---|---|---|
| 8,845,493 B2* | 9/2014 | Watterson | A63B 22/02 482/4 |
| 9,868,028 B2* | 1/2018 | Shin | A63B 21/00069 |
| 10,354,440 B2* | 7/2019 | Eyler | G06F 3/011 |
| 2001/0001303 A1* | 5/2001 | Ohsuga | A63F 13/10 482/8 |
| 2014/0274564 A1* | 9/2014 | Greenbaum | A63B 21/225 482/5 |
| 2019/0019329 A1* | 1/2019 | Eyler | G06T 19/006 |

* cited by examiner

*Primary Examiner* — Loan B Jimenez
*Assistant Examiner* — Kathleen M Fisk
(74) *Attorney, Agent, or Firm* — Ballard Spahr LLP

(57) ABSTRACT

Technologies are provided for generation of exertion-aware paths. Some embodiments include a computing system that can generate a path based at least on first data defining a terrain, second data defining a target level of total work, and third data defining a target level of perceived difficulty. The computing system also can generate a road surface along the path. Generating the road includes embedding metadata defining position-dependent resistance forces based on a physics model, the metadata controlling force feedback at virtual-reality equipment. The computing system also can supply the road surface to the virtual-reality equipment.

20 Claims, 29 Drawing Sheets

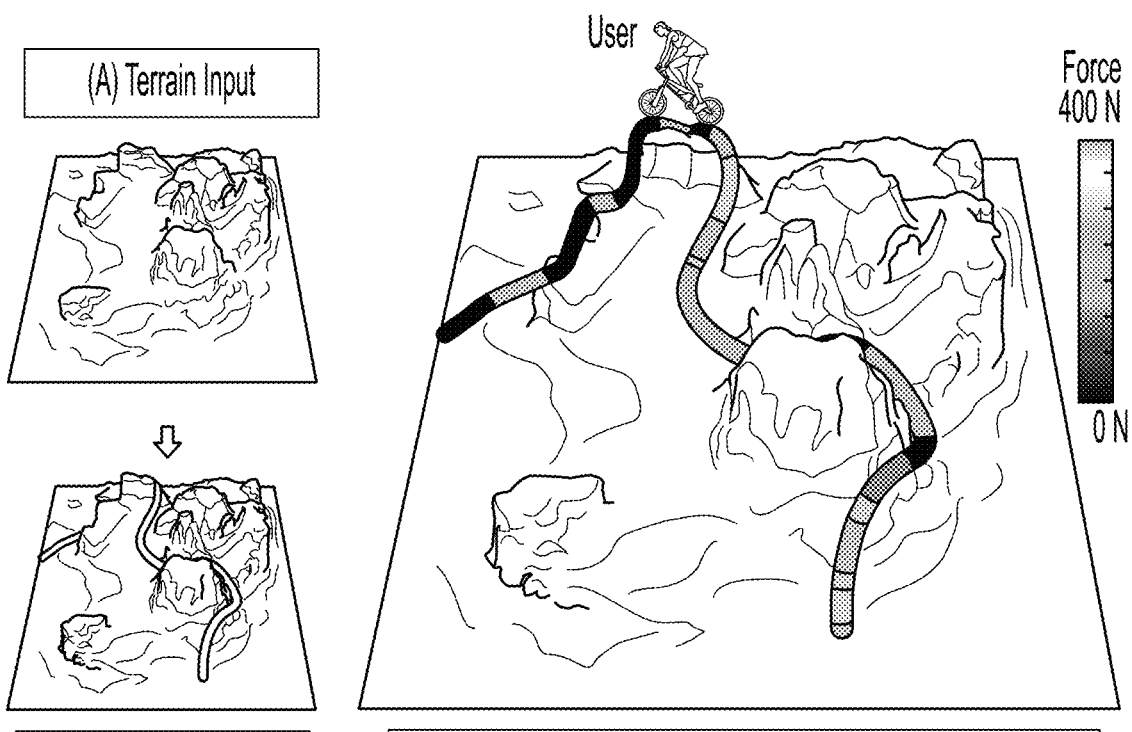
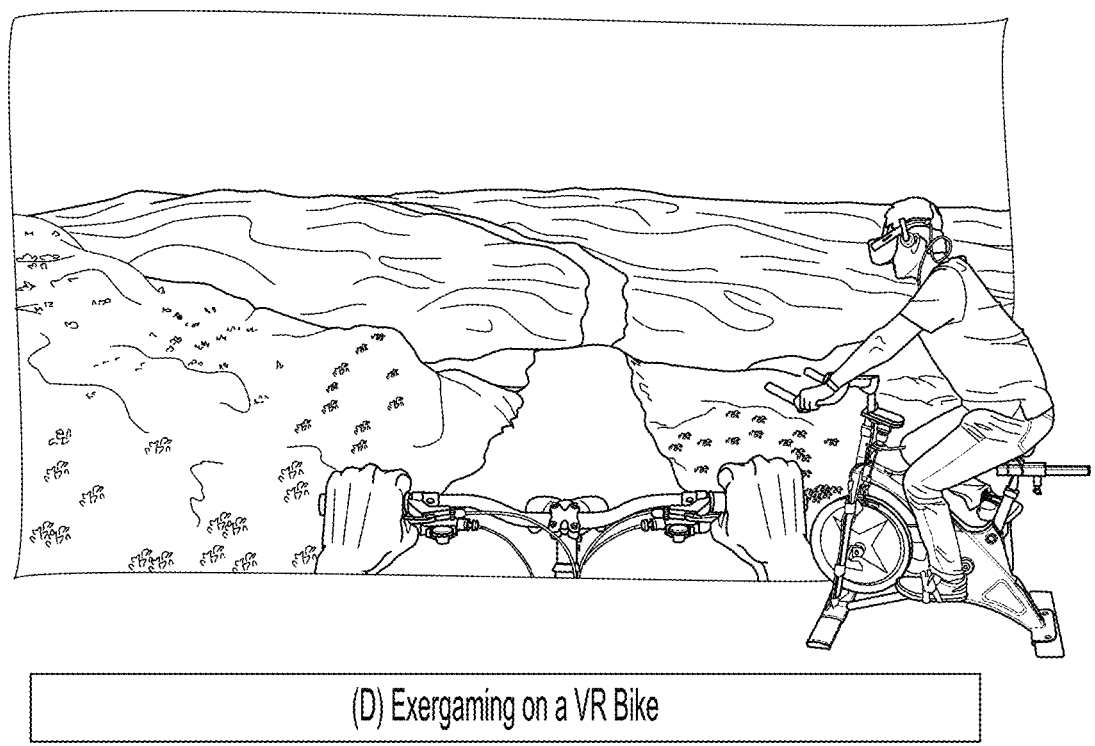
FIG. 1

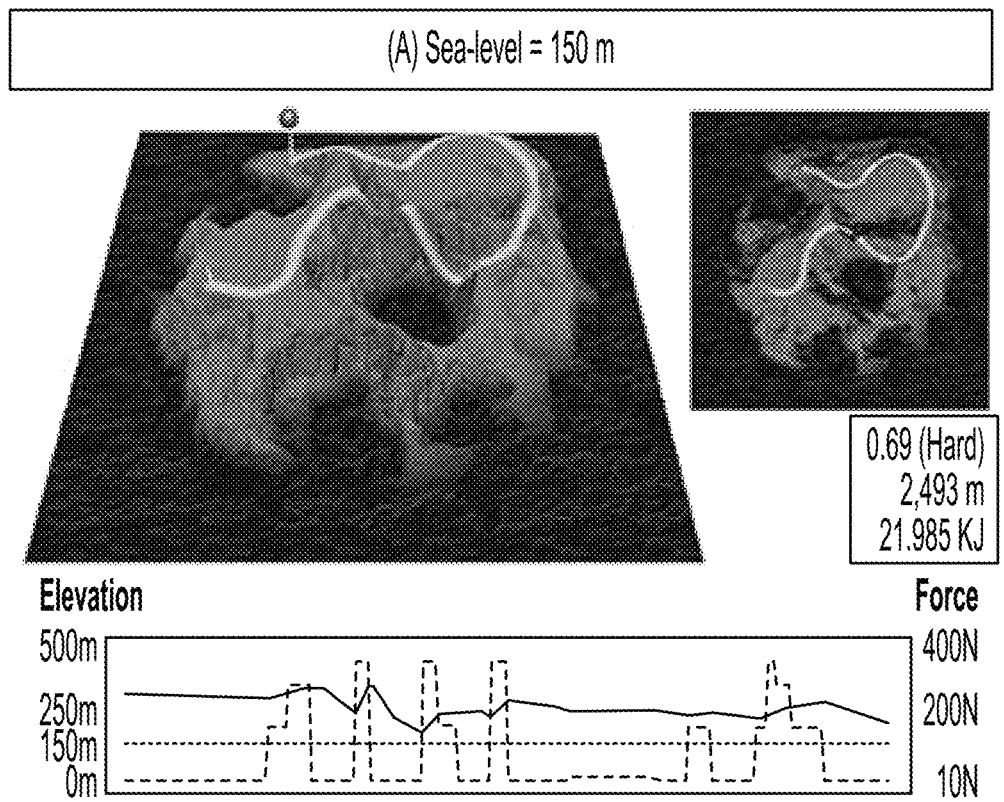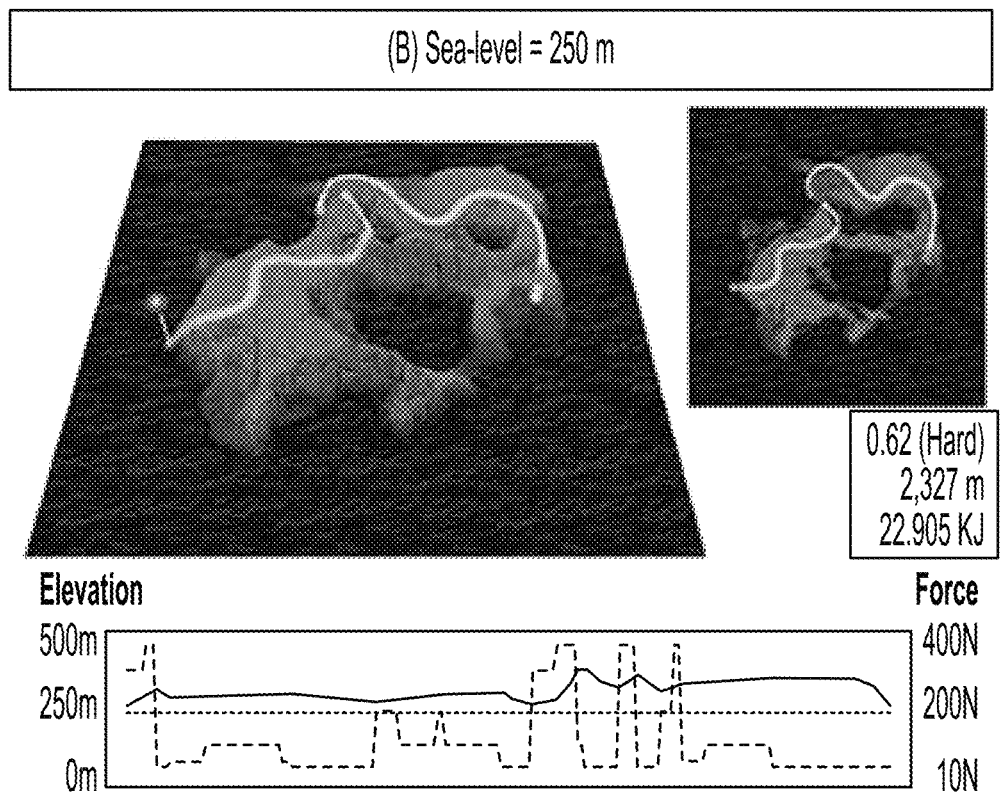
FIG. 15

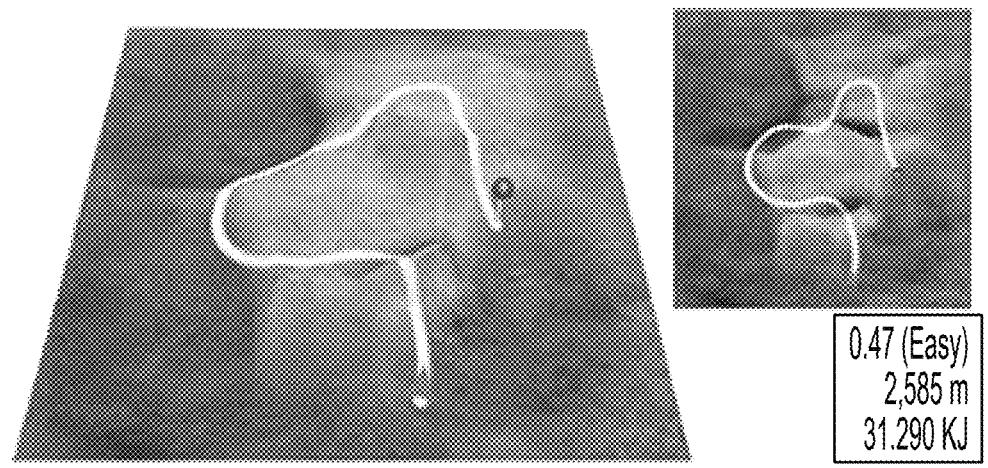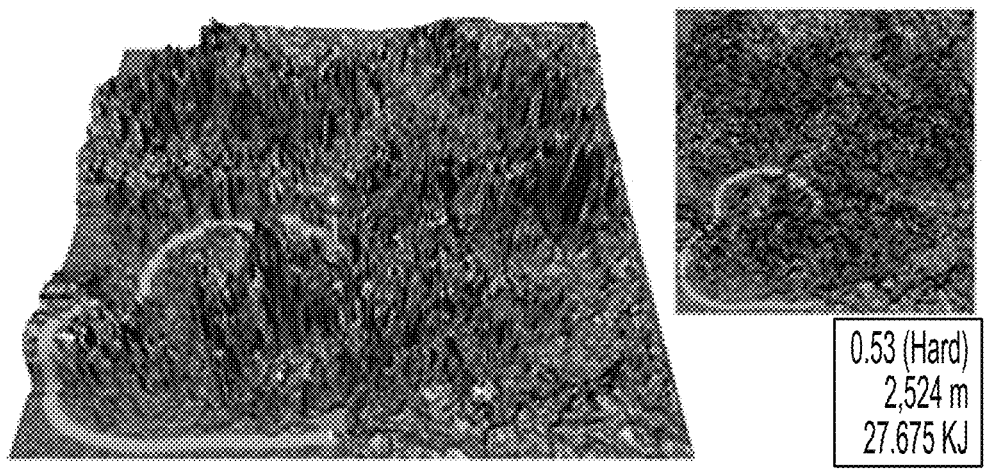
FIG. 20

Example Algorithm: Turning Points Extraction

1: function LINEARAPPROXIMATIONERROR($p_y(t), t_0, t_1$)
2:     totalError = $\int_{t_0}^{t_1} \left| p_y(t) - \left( p_y(t_0) + (t - t_0)\frac{p_y(t_1) - p_y(t_0)}{t_1 - t_0} \right) \right| dt$
    return totalError$/(t_1 - t_0)$
3: procedure LINEAR APPROXIMATION($p_y(t), \epsilon$)    ▷ $\epsilon$: max error
4:     $t_0 \leftarrow 0$    ▷ 0: time stamp of start point
5:     $t_1 \leftarrow \Delta t$    ▷ $\Delta t$: a small time step
6:     $T \leftarrow \{0\}$    ▷ $T$: a set of time stamps of turning points
7:     while $t_1 < 1$ do
8:        err $\leftarrow$ LINEARAPPROXIMATIONERROR($p_y(t), t_0, t_1$)
9:        while $t_1 < 1 \wedge$ err $< \epsilon$ do
10:           $t_1 \leftarrow t_1 + \Delta t$    ▷ $t_0$ stays, $t_1$ moves forward
11:           err $\leftarrow$ LINEARAPPROXIMATIONERROR($p_y(t), t_0, t_1$)
12:        $t_0 \leftarrow t_1 - \Delta t, T \leftarrow T \cup \{t_0\}$    ▷ add new turning point
    return $T \cup \{1\}$    ▷ add time stamp of end point

FIG. 21

EXERTION-AWARE PATH GENERATION

PRIORITY APPLICATION

This application claims the benefit of U.S. Provisional Patent Application No. 63/043,397, filed Jun. 24, 2020. The entire content of that prior-filed application is hereby incorporated by reference herein.

BACKGROUND

VR biking is one popular type of VR exergaming. In a VR biking game, the player (or user) is biking in a virtual environment while wearing a VR head-mounted display (HMD). The ultimate VR HMD should deliver virtual contents that are highly realistic in terms of visuals and haptics. The efforts of computer graphics researchers have led to the development of generative models and procedural modeling algorithms capable of synthesizing visually stunning virtual contents such as streets, roads, terrains, cities, and worlds. However, as virtual content is mainly employed for visualization purposes, haptic properties, such as the force feedback afforded by virtual content, are typically not considered in their synthesis.

SUMMARY

Technologies described herein address the issue of providing satisfactory forms of exergaming. In some embodiments, the technologies described herein provide generation of paths based on a particular terrain, a desired level of exertion, and/or a desired level of perceived difficulty. Such a path lies on the terrain and can be referred to as an exertion-aware path. In addition, or in other embodiments, the technologies described herein can generate an exertion-aware path that passes near a defined group of landmarks and/or avoids a particular group of obstacles. An exertion-aware path can be utilized to generate a road along the path, over the terrain.

Embodiments of the disclosure comprise a computing system. The computing system comprises at least one processor. The computing system also comprises at least one memory device having computer-executable instructions stored thereon that, in response to execution by the at least one processor, cause the computing system to generate a path based at least on first data defining a terrain, second data defining a target level of total work, and third data defining a target level of perceived difficulty; generate a road surface along the path, where generating the road surface includes embedding metadata defining position-dependent resistance forces based on a physics model, the metadata controlling force feedback at virtual-reality equipment; and supply the road surface to virtual-reality equipment.

Embodiments of the disclosure also comprise a computer-implemented method. The computer-implemented method comprises generating, by a computing system comprising at least one processor, a path based at least on first data defining a terrain, second data defining a target level of total work, and third data defining a target level of perceived difficulty. The computer-implemented method also comprises generating, by the computing system, a road surface along the path, where generating the road surface includes embedding metadata defining position-dependent resistance forces based on a physics model, the metadata controlling force feedback at virtual-reality equipment. The computer-implemented method further comprises supplying, by the computing system, the road surface to virtual-reality equipment.

Embodiments of the disclosure further comprise a computer-program product. The computer-program program product comprises at least one computer-readable non-transitory storage medium having encoded thereon instructions that, in response to execution, cause a computing system to perform or facilitate operations comprising: generating a path based at least on first data defining a terrain, second data defining a target level of total work, and third data defining a target level of perceived difficulty; generating a road surface along the path, where generating the road surface includes embedding metadata defining position-dependent resistance forces based on a physics model, the metadata controlling force feedback at virtual-reality equipment; and supplying the road surface to virtual-reality equipment.

Embodiments of the disclosure can provide several advantages over commonplace platforms for the design of exergames. In one example, in contrast to such commonplace platforms, embodiments of this disclosure incorporate exertion and perception aspects of a virtual training experience, such as the total work done and the perceived difficulty of the exertion-aware path as optimization terms in path generation. Considering the physical interactions such as the force feedback that the virtual content affords in VR can make the virtual training experience more realistic, immersive, and hence more enjoyable and engaging.

By solving the exergame level design problem as an optimization problem, the techniques described herein permits the generation of exergame levels—paths with desirable exertion effects in this disclosure, for example—in a fast, scalable, and automatic manner. Therefore, making more efficient use of computing resources (e.g., processing time, memory, bandwidth, etc.) than existing computing platforms. Embodiments of the disclosure can provide ample and explicit controls to a designer computing system to generate paths satisfying one or several configurable constraints.

Additional advantages will be set forth in part in the description which follows or may be learned by practice. The advantages will be realized and attained by means of the elements and combinations particularly pointed out in the appended claims.

Although embodiments of the disclosure are described in connection with biking paths and virtual-reality bikes, the disclosure is not limited in that respect. Indeed the principles of this disclosure can be applied to other type of virtual-reality equipment, such as a treadmill, an elliptical machine, or a skiing simulator.

BRIEF DESCRIPTION OF THE DRAWINGS

FIG. 1 depicts (a) a terrain as input, (b) an exertion-aware path that satisfies the user-specified exertion goals such as the total work and perceived level of path difficulty, (c) forces that a user experiences along the path, and (d) the user bikes along the generated path in virtual reality via a VR headset and our custom-built exercise bike whose feedback force changes with the generated path, giving a highly immersive experience, in accordance with one or more embodiments of the present disclosure.

FIG. 7A depicts an example of a drag strategy;

FIG. 7B depicts an example of a shift strategy;

FIG. 7C depicts an example of a reverse strategy;

FIG. 7D depicts an example of a shrink strategy;

FIG. 7E depicts an example of an expand strategy;

FIG. 7F depicts an example of a translate strategy;

FIG. 7G depicts an example of a rotate strategy; and

FIG. 7H depicts n example of another rotate strategy.

FIG. 12A depicts a first path generated on a first terrain (referred to as Rocky Hill, simply for the sake of nomenclature);

FIG. 12B depicts a first path generated on a second terrain (referred to as Terrace Hill, simply for the sake of nomenclature); and FIG. 12C depicts a first path generated on a third terrain (referred to as Desert Hill, simply for the sake of nomenclature);

FIG. 15 depicts paths generated with the avoidance of forbidden zones which refer to sea water in this example, in accordance with one or more embodiments of the present disclosure. In (a) a path generated as the sea level is 150 m, (b) a path generated as the sea level rises to 250 m. Feedback force is shown as a dashed line, elevation is shown as a solid line, and sea level is shown as a dotted line. A triangle marking and a pin marking identify the start point and end point respectively

FIG. 20 depicts scenarios in which a path remained undefined after implementation of iterative optimization, in accordance with one or more embodiments of the present disclosure. Feedback force is shown as a dashed line and elevation is shown as a solid line. A triangle marking and a pin marking identify the start point and end point respectively.

FIG. 21 depicts an example of an algorithm to determine turning points in path, in accordance with one or more embodiments of this disclosure.

DETAILED DESCRIPTION

Figure 2A:
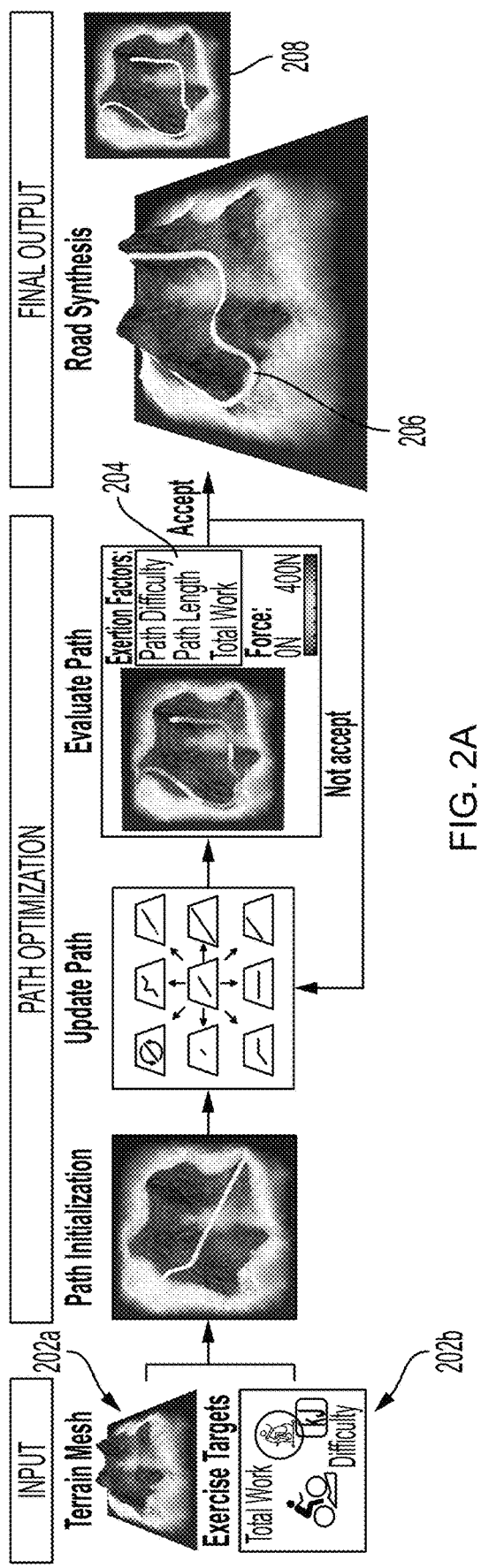
FIG. 2A depicts an overview of a technique for generation of an exertion-aware path, in accordance with one or more embodiments of the present disclosure.

Embodiments of the present disclosure will now be described with reference to the drawing figures, in which like reference numerals refer to like parts throughout.

While VR training and VR workout are gaining popularity, VR training content is manually created by designers. Embodiments of the present disclosure advantageously provide a machine learning (ML)/artificial intelligence (AI) approach to automatically generate a path on terrain that delivers realistic feedback through which the user or player can achieve specific exertion goals after biking along this generated path, such as, for example, how much energy you want to burn after biking the whole path, how difficult it is during the biking experiences, etc.

In one embodiment, a system includes a memory and a processor configured to generate a virtual reality (VR) bike path based on terrain data and one or more user exertion goals, apply road surface haptic effects to the VR bike path, and store the VR bike path in memory for downloading to a VR system. The VR bike path includes haptic feedback, and may be generated based on resistance forces that are simulated through a physics model. The road surface haptic effects may be based on road construction engineering data. The VR system may include a VR computer, a VR HMD that is configured to deliver at least visual data, and a VR bike that is configured to deliver the haptic feedback.

Embodiments of the present disclosure enable a designer computing systems or devices to generate exertion-aware paths in a fast, scalable, personalized, and automatic manner. The designer computing system can also generate paths with different spatial considerations using constraints such as landmarks and forbidden zones, which are hard to create manually. The generated virtual path geometry may be refined by applying certain road construction engineering concepts to generate a smooth and natural VR roadway. Additionally, in order to make the VR biking experience more immersive, embodiments of the present disclosure include a bike that is programmed to automatically adjust the resistance forces that match the physical property of the path according to the physics rules.

Creating a plausible exergame typically requires repeated trial and error. Embodiments of the present disclosure enable designer computing systems or devices to generate paths with desirable exertion effects in a fast, scalable and automatic manner. In many embodiments, the generated path can be applied to control the force feedback of an exercise bike such that a user's haptic experience matches with his visual perception as he bikes along the path. In some embodiments, a haptic feedback-driven path optimization approach is developed to achieve the exertion goals during which the resistance force is simulated through physics rules. Next, a numerical method for road surface modeling with an interdisciplinary approach involving the road construction engineering fields is applied. Then, the generated path is downloaded to a VR computer system that includes a VR bike that is configured to deliver realistic feedback through which the user can achieve specific exertion goals after biking along this generated path.

Embodiments of the present disclosure can be easily transplanted or extended for generating virtual training content for other popular exercise machines such as, for example, a treadmill, an elliptical machine, rowing machines, etc.

Embodiments of the present disclosure generate virtual content with the consideration of haptic properties afforded by the content. More specifically, an optimization-based approach generates paths on a terrain that are both visually realistic and associated with desired exertion properties. Users can experience the generated paths in virtual reality through riding an exercise bike whose resistance is adjusted according to the elevation angle of the paths. The users' haptic feelings of the paths match with their visual perception, lead to enhanced realism and immersiveness. For example, they would feel that it is physically more demanding to ride uphill than downhill as the bike's resistance increases with the elevation angle of the generated paths. After riding the generated paths in virtual reality, users will also accomplish their exertion goals (in terms of total work done, for example). Leveraging exertion-aware paths and setup, biking in a virtual world resembles biking in the real world.

One of many challenges in developing exergames is game level design, which is typically done manually by level designers under current practice. The design process is tedious as it involves tuning a level to satisfy multiple non-trivial goals and constraints such as helping the player achieve a certain amount of exercise, ensuring the visual realism and aesthetic quality of the game level, and constraining the game duration. Creating a plausible level typically requires repeated trial and error. By solving the exergame level design problem as an optimization problem, embodiments of the present disclosure enable game level designer computing systems or devices to generate exergame levels, paths with desirable exertion effects in our case, in a fast, scalable, and automatic manner. The computational design framework also provides ample and explicit controls to designer computing systems or devices to generate paths satisfying certain design preferences by specifying constraints.

Procedural modeling is widely applied to generate virtual world content such as terrains, rivers, roads, buildings, and cities in a scalable manner, reducing the cost of production by manual design.

For road generation, the slope of a specified terrain may be encoded as well as natural obstacles as part of their objective cost functions that were procedurally minimized. Along a similar direction, hierarchical road networks may be procedurally generated that connected cites, villages, and towns given a large terrain; while traffic simulations may be applied in the neighborhood to generate major roads in an urban setting. Moreover, an example-based approach may be used to incorporate user input with its underlying terrain to generate and adapt roads in existing road networks. These mainly focus on the interaction among the urban and natural components on the given terrain instead of the human experience in navigating the generated roads. Embodiments of the present disclosure focus on the player's physical experience of the generated paths as they ride along the paths in virtual reality with a device (e.g., an exercise bike) capable of providing force feedback.

While some research efforts focus on generating virtual worlds for a game, others consider gameplay experience and the player's skills for adjusting game levels automatically through algorithmic means. For example, rules-based methods may be used to dynamically adjust game level difficulty based on the real-time performance of the player. Similarly, a data-driven approach may be applied to consider an individual's skills in generating an educational game. In contrast, embodiments of the present disclosure focus on considering the physical exertion and immersive experience of the player in procedural game generation.

Exergames refer to a genre of games that encourage people to exercise while playing a game. Exergames use motion sensing devices such as a depth sensor (e.g. Microsoft Kinect, PlayStation Camera) or a motion controller (e.g. Wii Remote, PlayStation Move, Nintendo Joy-Con) to capture body movement. The genre has gradually evolved from console exergames such as Microsoft Fitness and Nintendo Wii Sports to VR platform games and games played on sport equipment (e.g., VirZOOM bike). The use of motion sensing devices for game design enables the tracking and incorporation of the player's motion and physical experience in the game mechanics, making exergames engaging as an alternative form of exercises. For example, players may be enabled to train different muscle groups to improve their reflex, balance, and coordination using fitness equipment while wearing a VR headset. VirZoom and CSE Entertainment developed exergaming systems that allow players to bike in virtual scenes by wearing a VR headset when using an exercise bike.

Furthermore, research has shown the positive effects of exergaming for rehabilitation and therapy such as weight control, balance enhancement, and cognitive-motor training. Exergames may help adolescents and adults to achieve their weight loss. Exergaming can effectively improve an elder's balance and movement performance. Exergaming can improve cognitive and dual-task functions. One of the important remarks for the success of previous research is integrating exercises with virtual content to motivate players to achieve exercise goals.

However, most of the existing exergame content and settings are manually constructed and tested. Such a trial and error approach is time consuming and expensive. Embodiments of the present disclosure provide a computational design framework that enables path-finding on a terrain to achieve desired exertion goals. In addition, embodiments of the present disclosure create an engaging exertion experience that allows players to bike the generated paths in virtual reality while training their lower body strength.

Immersiveness is an important factor to consider in designing virtual reality content. Presence, a form of immersion, is highly connected to a user's enjoyment level in a virtual reality setting. Therefore, to create a realistic virtual environment, visual, sound, and locomotion aspects of a virtual environment may enhance the sense of presence for virtual experience. In particular, creating an immersive biking experience may focus on the cycling aspect of speed, force feedback control, and road surface texture. Typically, these virtual environments may be manually created or did not consider the physical aspects of a player in the virtual biking experience. In contrast, embodiments of the present disclosure consider the exertion and perception aspects of the virtual training experience such as the total work done and the perceived difficulty of the path as optimization terms in the path generation. Considering the physical interactions such as the force feedback that the virtual content affords in VR will make the virtual training experience more realistic, immersive, and hence more enjoyable and engaging.

Pathfinding may overcome challenges in applications such as robotic simulation, traffic simulation and games. Algorithms based on graph search (e.g., A*), sampling (e.g., RRT), agents, and optimization, etc. may be used for pathfinding and motion planning.

For example, the first-in-first-out property of traffic may be used to enable A* search algorithm to plan for large-scale vehicle routes. The anytime property of RRT* may be used to improve efficiency during online motion planning. AutonoVi is an optimization-based maneuver planning for autonomous vehicle navigation that supports dynamic maneuvers. An agent-based approach may be used to consider human perception and wayfinding for generating paths. A Partial-Refinement A* (PRA*) approach may be used for pathfinding in real-time strategy games.

Pathfinding in an open terrain is often assumed to be isotropic; the cost of the path is independent of the traveling direction. Embodiments of the present disclosure uniformly discretize the terrain and assume the path generation problem is anisotropic such that the costs associated with the generated path depend on the traveling direction. Such costs associate physical exertion effects with geometric information such as the elevation of the path in the optimization.

FIG. 1 depicts (a) a terrain as input, (b) an exertion-aware path that satisfies the user-specified exertion goals such as the total work and perceived level of path difficulty, (c) forces that a user experiences along the path, and (d) the user bikes along the generated path in virtual reality via a VR headset and an example of an exercise bike (e.g., a custom-built exercise bike) having feedback force that changes with the generated path, giving a highly immersive experience, in accordance with an embodiment of the present disclosure. As is shown in panel (d) of FIG. 1, the VR headset can present a viewport that is rendered through a camera placed on the path, the camera having a vantage point that corresponds to a point of view of a user traversing the path in the VR world. That point of view provides a view of a road in front of the user in the VR world, where the road is generated in accordance with aspects described herein. As the path is traversed, the VR headset automatically presents an updated image of the road, with that point of view, as is shown in this figure.

Figure 2B:
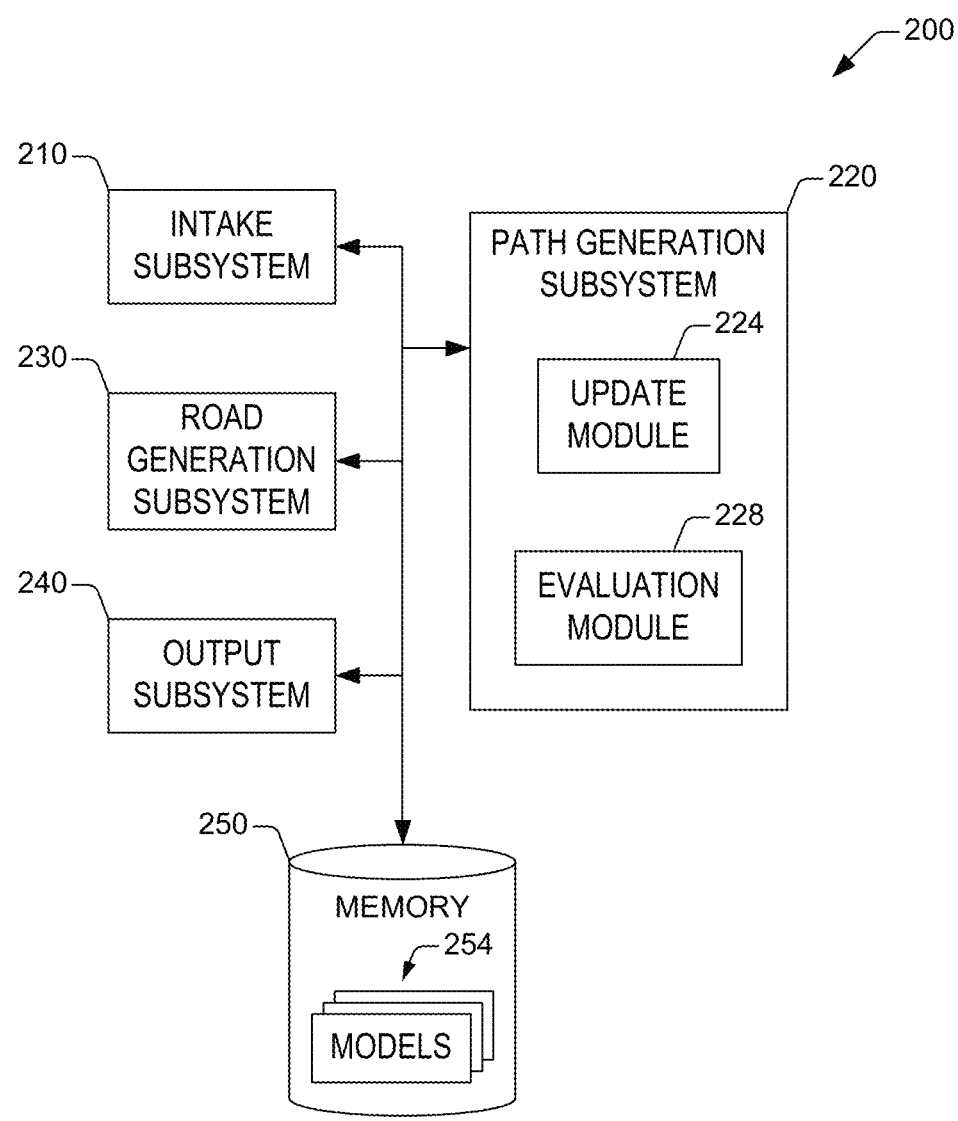
FIG. 2B depicts an example of a computing system for generation of exertion-aware path, in accordance with one or more embodiments of the present disclosure.

FIG. 2A illustrates an overview of a technique for generation of an exertion-aware path, in accordance with an embodiment of the present disclosure. Given a terrain, a total work target, and a target level of perceived path difficulty as input, the goal is to generate an exertion-aware path over the terrain. In some embodiments, as is shown in FIG. 2B, a computing system 200 can include an intake subsystem 210 that receives input data defining terrain and various target levels. The input data can include a first dataset 202a embodying an elevation mesh defining the terrain. In addition, or in some cases, the first data also can include metadata defining particular features of the terrain (such as vegetation, rock, sand, or the like) at respective points in the elevation mesh. The input data also can include second datasets 20b defining a target level of total work and a target level of perceived difficulty. The user can ride an exercise bike along the generated exertion-aware path 206 having elevation angles that can be used to adjust the force feedback of the exercise bike based on a physical model, such that the user's haptic feeling matches with his visual perception of the exertion-aware path. Upon completing the exertion-aware path, the user can have also achieved the target amount of exertion (that is, achieved the total work target).

One aspect of this disclosure includes an optimization framework. The total work target and the target level of perceived path difficulty are encoded as optimization goals. The optimization proceeds iteratively. At each iteration, the generated path is evaluated in terms of the exertion that the generated path can induce to the user biking along the path. The generated path can also be evaluated in terms of the perceived difficulty of the path predicted by a classification model (or classifier) trained with a dataset of real bike paths annotated with difficulty ratings. The optimization proceeds until a path that satisfies all the desired properties is generated. In some embodiments, as is shown in FIG. 2B, the computing system 200 can include a path generation subsystem 220 that can iteratively generate a path by solving an optimization problem with respect to a cost function. The path generation subsystem 220 can include an update module 224 that can update a current path in order to produce a next path. The path generation subsystem 220 also can include an evaluation module 228 that, in one aspect, can determine a value of the cost function for a next path and can evaluate perceived difficulty of the next path that has been produced, To that end, the cost function can be retained as a model within one or more memory devices 250 (referred to as memory 250), as one of multiple models 254, and the evaluation module 228 can determine the value of the cost function by using the next path. Further, the evaluation module 228 also can apply a classification model to the next path, resulting in a classification attribute (a numerical value and/or a label) indicative of perceived difficulty of the next path. The classification model can be retained within the memory 250, as one of the multiple models 254. In some embodiments, the classification model can be embodied in a feedforward artificial neural network (ANN) or another type of machine-learning classifier. As a result of the evaluation, as is shown in FIG. 2A, the evaluation module 228 can generate a triple 204 indicative of path length, total work, and path difficulty, for example. The evaluation module 228 also can determine if the current path satisfies a termination criterion.

After a termination criterion has been satisfied, embodiments of the present disclosure can then synthesize a road surface 206 along the generated path and also can slightly refine the terrain to make the cross-section of the road surface 206 horizontal, for a natural riding experience. To that end, in some embodiments, the computing system 200 (FIG. 2B) can include a road generation subsystem 230. The road generation subsystem 230 also can embed metadata defining position-dependent resistance forces based on a physics model, where the metadata can control force feedback at a VR bike or another type of virtual-reality equipment. Such resistance forces can be generated at each iteration of the optimization, and after the optimization has converged, the metadata can be embedded in a generated route surface.

In some cases, a two-dimensional projection (e.g., a top view) of the terrain and the road surface 206 can be output. The computing system 200 can include an output subsystem 240 that can supply at least the generated road surface to a VR bike (not depicted in FIG. 2B) or another type of equipment or computing device (neither depicted in FIG. 2B).

The user can then bike along the generated path to achieve his exertion goal, using a VR bike whose force feedback is controlled by the elevation angle of the generated path.

Figure 3:
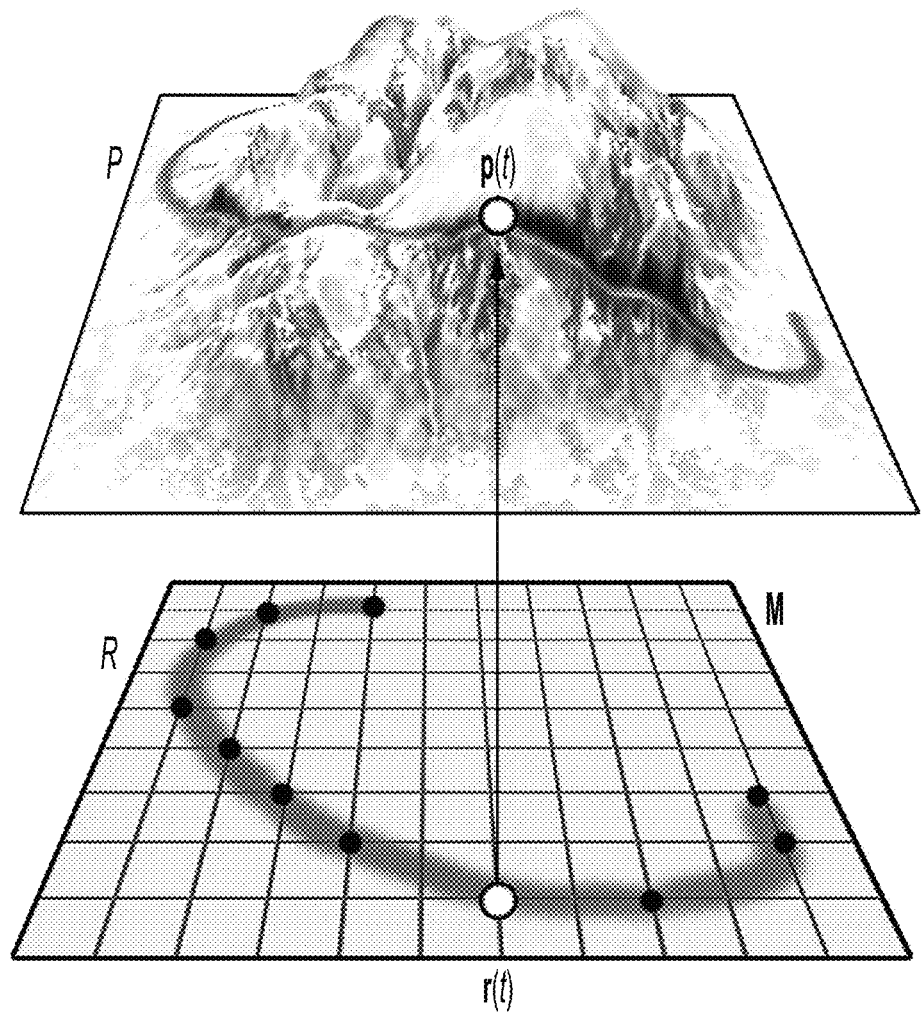
FIG. 3 depicts a problem representation, in accordance with one or more embodiments of the present disclosure. Black dots represent control points of curve $\mathcal{R}$.

FIG. 3 depicts the representation of the problem, in accordance with one or more embodiments of the present disclosure. In one aspect, embodiments of this disclosure can generate a path $\mathcal{P}$ on the input 3D terrain by optimization to satisfy desired properties.

On the xz-plane, a 2D Hermite curve $\mathcal{R}$ is constructed which is mapped to the 3D terrain to generate the path $\mathcal{P}$. The xz-plane is overlaid with an N×N grid called path grid M. The 2D Hermite curve $\mathcal{R}$ is constructed by a sequence of control points. Each control point is located at a grid intersection as is shown in FIG. 3. For notation convenience, M denotes an N×N occupancy matrix of the path grid. An entry of M stores an index of a control point that is located at the entry's corresponding grid intersection on the xz-plane; otherwise it stores a value of −1 to indicate that no control point is located there. A value of N=20 is used in some embodiments. The disclosure, however, is not limited in that respect. Indeed, fewer or more than 20 control points can be used for generation of an exertion-aware path in accordance with aspects of this disclosure. Control points are represented by black solid circles in FIG. 3.

The 2D Hermite curve $\mathcal{R}$ is $C^1$ continuous. Curve $\mathcal{R}$ is parameterized such that a point on the curve $\mathcal{R}$ is denoted by r(t), where t∈[0, 1]. Here, r(0) and r(1) represent the start point and end point of the curve $\mathcal{R}$.

The 2D curve $\mathcal{R}$ on the xz-plane is mapped to the path $\mathcal{P}$ on the surface of the 3D terrain using a height map function H of the terrain. Every 2D point $(r_x(t), r_z(t))$ on curve $\mathcal{R}$ on the xz-plane has its corresponding elevation $H(r_x(t), r_z(t))$ on the 3D terrain. Upon mapping and parameterization, the path $\mathcal{P}$ on the 3D terrain is given by $p(t)=(r_x(t), H(r_x(t), r_z(t)), r_z(t))$, where t∈[0, 1]. Here, p(0) and p(1) represent the start point and end point of path $\mathcal{P}$.

The goal of the optimization is to find a path $\mathcal{P}$ that minimizes the total cost function $\mathcal{C}_{total}(\mathcal{P})$ which evaluates the overall error of the path $\mathcal{P}$ generated through path grid M. The total cost function $\mathcal{C}_{total}(\mathcal{P})$ is defined as:

$$\mathcal{C}_{total}(\mathcal{P}) = w_L \mathcal{C}_L(\mathcal{P}) + w_W \mathcal{C}_W(\mathcal{P}) + w_D \mathcal{C}_D(\mathcal{P}), \quad \text{Eq. (1)}$$

where the path length cost $\mathcal{C}_L(\mathcal{P})$ encodes the prior path length; the total work cost $\mathcal{C}_W(\mathcal{P})$ encodes the target amount of total work induced on the user for completing path $\mathcal{P}$ on a VR bike; and the path difficulty cost $\mathcal{C}_D(\mathcal{P})$ encodes the target level of perceived path difficulty with respect to the variation of the path elevation throughout the biking experience. The $w_L$, $w_W$, and $w_D$ represent respective blending weights of those three cost terms.

The optimization framework considers a number of cost terms to guide the generation of a path to carry certain exertion-related properties. While the framework is extensible to incorporate additional considerations and constraints, three cost terms related to the exercise duration, how much total work the generated path induces on the user, and the perceived level of difficulty during the biking experience are considered in some embodiments. Such factors are similar to those considered in real world when a biking path is selected.

Different players may prefer different exercise duration for achieving different training goals. Given a certain biking speed, the duration of the exercise depends on the total length of the path. To adjust the length of the path, the path length cost measures the difference between the length L($\mathcal{P}$) of the generated path and a path length target $\rho_L$. Path length cost $\mathcal{C}_L(\mathcal{P})$ is defined as:

$$C_L(\mathcal{P}) = 1 - \exp\left(-\left(\frac{L(\mathcal{P}) - \rho_L}{\sigma_L}\right)^2\right), \quad \text{Eq. (2)}$$

where $\sigma_L = 2\rho_L$. Other relative magnitudes of the $\sigma_L$ and $\rho_L$ also can be contemplated. In Eq. (2), the length $L(\mathcal{P})$ of the path $\mathcal{P}$ can be determined through the following line integral:

$$L(\mathcal{P}) = \int \mathcal{P} \, dp = \int_0^1 |p'(t)| dt \qquad \text{Eq. (3)}$$

Another consideration is the total work resulting from completing path $\mathcal{P}$ by riding on a VR bike. Different types of exercises induce different total works. For example, cardiovascular exercises typically expend more energy than weight training exercises do per training session. Thus, it can be challenging to manually tune a level (such as a path, for example) to associate it with an arbitrary total work target as tuning such a level involves non-trivial physics considerations of the force and movement of the user during the exergame.

To incorporate total work exerted as a result of completing a path, the expected total work $W(\mathcal{P})$ for a generated path $\mathcal{P}$ can be formulated based on to a physics model, and compared with the desired total work target $\rho_W$. The total work cost $\mathcal{C}_W(\mathcal{P})$ can be defined as:

$$C_W(\mathcal{P}) = 1 - \exp\left(-\left(\frac{W(\mathcal{P}) - \rho_W}{\sigma_W}\right)^2\right), \qquad \text{Eq. (4)}$$

where $\sigma_W = 2\rho_W$. Other relative magnitudes of the $\sigma_L$ and $\rho_W$ also can be contemplated. Here, $W(\mathcal{P})$ is the total work resulting from completing path $\mathcal{P}$ can be determined through the following line integral:

$$W(\mathcal{P}) = \lambda \int \mathcal{P} f(t) dp = \lambda \int_0^1 f(t) |p'(t)| dt. \qquad \text{Eq. (5)}$$

where $f(t)$ is the resistance force experienced by the user along the path $p(t)$ as the path elevation angle $\theta(t)$ changes. From the directional derivative of the height map function $H$, the following expression for $\theta(t)$ can be obtained:

$$\theta(t) = \tan^{-1}\left(\frac{dr(t)}{dt} \cdot \nabla H(r(t))\right).$$

Here, $\lambda$ is a parameter for scaling the distance of the path in the virtual world down to the real moving distance of a pedal of the exercise bike that the user rides. Simply as an illustration, suppose a path in the virtual world is 1,000 m long, with $\lambda = 0.1$, the user may just need to ride 100 m on the exercise bike to complete the path.

Figure 4:
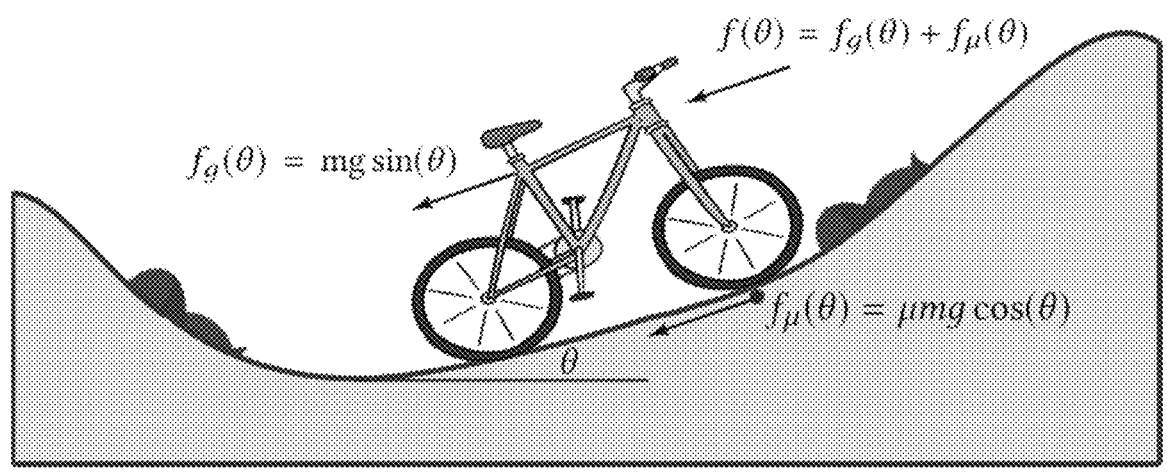
FIG. 4 depicts resistance force, in accordance with one or more embodiments of the present disclosure. A bike experiences a resistance force f which varies with the path elevation angle θ. The resistance force is composed of the gravitational force $f_g$ and frictional force $f_\mu$.

According to the physics model shown in FIG. 4, a bike traveling on a slope would experience a resistance force $f$ composed of the gravitational force $f_g$ and the frictional force $f_\mu$. The resistance force can vary with the path elevation angle $\theta$. By decomposition of forces, the resistance force can be determined as follows:

$$f(\theta) = mg \sin\theta + \mu mg \cos\theta \qquad \text{Eq. (6)}$$

where $m$ is the mass; $g$ is the gravitational constant; and $\mu$ is the friction coefficient of the terrain surface. In some embodiments, the friction coefficient can be constant across the entire surface of a path. That is, surface material across a terrain can considered to be uniform. The disclosure, however, is not limited in that respect. Indeed, in some embodiments, the friction coefficient can be non-uniform, depending on position on the terrain in order to represent various surface materials (e.g., mud, sand, and concrete) across the terrain. In addition, or in alternative embodiments, one or more other factors can be incorporated into modeling the friction coefficient. For instance, weather effects on the friction of the road can be contemplated. In an example embodiment, a path on rainy conditions can be more slippery than on sunny conditions. Such variation can be incorporated into the physical model by adjusting the friction coefficient to each one of those conditions.

Figure 5:
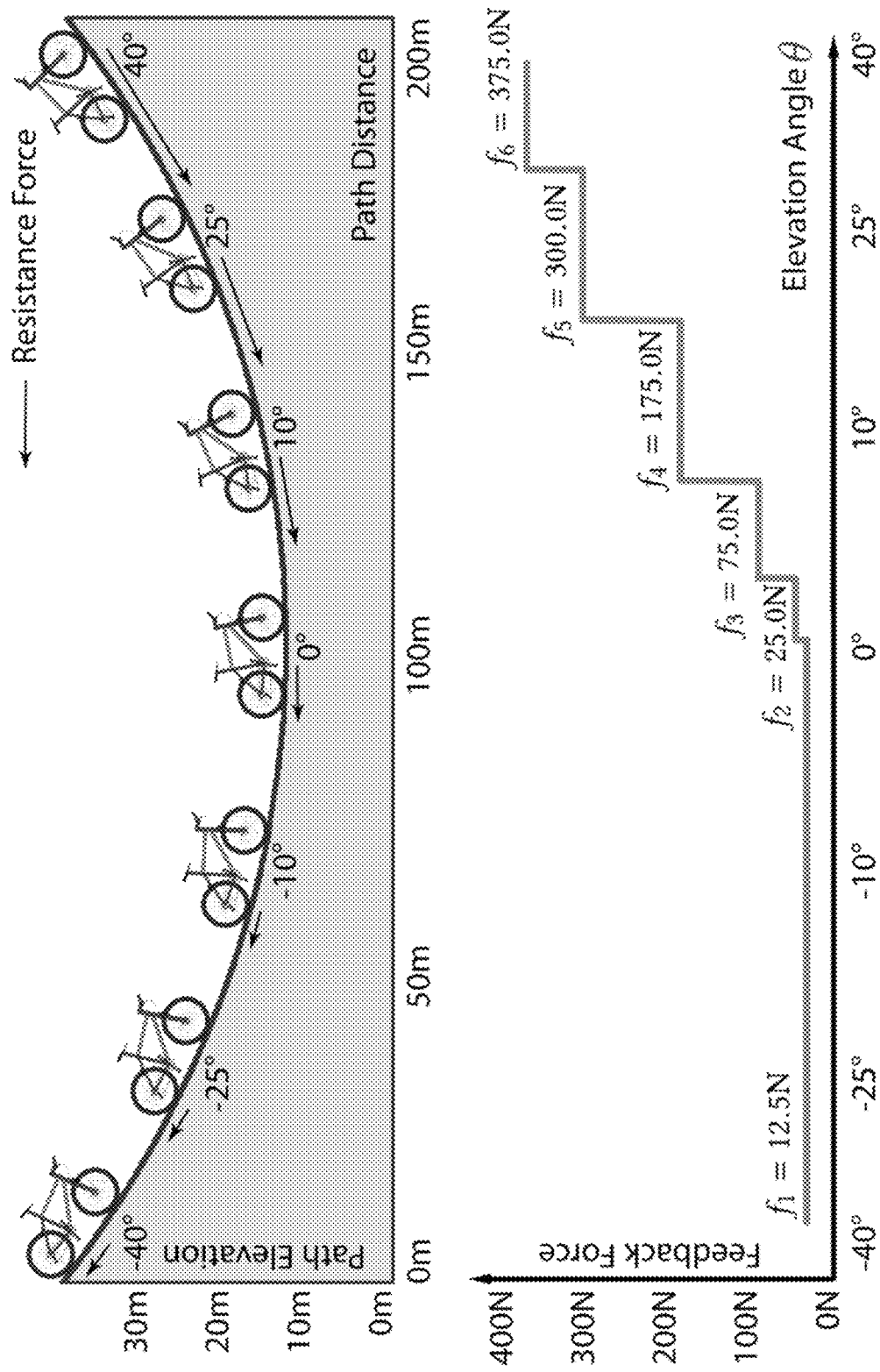
FIG. 5 depicts at the top: a path whose elevation angle changes smoothly from −40° to 40°; at the bottom: the force feedback of the exercise bike used to approximate the resistance force experienced at the corresponding elevation angle, in accordance with one or more embodiments of the present disclosure.

The resistance force $f(t)$ in Eq. (5) can be simulated by the feedback force of an exercise bike that the user rides. The exercise bike can give a discrete set of feedback forces $F = \{f_i\}$ through its pedals. As an example, bottom panel of FIG. 5 illustrates the feedback forces $\{f_1, f_2, f_3, f_4, f_5, f_6\}$ of the exercise bike used in some experiments. The disclosure is not limited to six different levels and, in some embodiments, fewer or more than six levels can be utilized.

For simplicity, assume mass m=70 kg which is slightly above the average global body mass. Biking on a horizontal path ($\theta = 0$) should be associated with a small feedback force ($f_2$) of the exercise bike. In this case, the user only experiences the frictional force as the resistance force according to FIG. 4. Using Eq. (6), the friction coefficient can be determined to be $$\mu = \frac{f_2}{mg}.$$

As the user bikes along the path $p(t)$, the resistance force $f(\theta)$ that the user should experience in reality according to the physics model can be determined from Eq. (6). Then a feedback force $f_i \in F$ that is closest to $f(\theta)$ is given by the exercise bike to approximate the resistance force $f(\theta)$. Accordingly, the user can experience a feedback force $f_i$ that realistically increases with the path elevation angle.

As the resistance force $f(\theta)$ is simulated by the feedback force $f_i$ of the exercise bike, for computing the total work cost $\mathcal{C}_W(\mathcal{P})$, $f(t) = f_i$ is considered in order to calculate the total work $W(\mathcal{P})$ in Eq. (5).

FIG. 5 depicts the feedback force assigned according to the path elevation angle. For going uphill, elevation angles up to 40° that correspond to an 84% gradient are very challenging. For going downhill ($\theta < 0°$), the user experiences a net force pushing him downwards according to Eq. (6). In some embodiments, the user only rides using a very small force in this case that corresponds to the minimum feedback force $f_1$ of the exercise bike.

Biking on a horizontal path may be associated with a feedback force other than $f_2$ of the exercise bike. For example, if it is desired to simulate biking on a rough surface (e.g., a muddy road) with a high friction, it could be associated with a higher feedback force level (e.g., $f_3$). In this case, a larger $\mu$ will be obtained and the user will experience a larger simulated frictional force.

The bumpiness of a path is related to the perceived level of biking difficulty. For example, a trail on a bumpy mountain is usually perceived as more difficult to bike than a trail on a plain. An example of a source of data identifying perceived level of biking difficulty is the MTB Project, a website that collects people's ratings of the biking difficulty of different trails.

As the perception of biking difficulty is subjective, the path difficulty cost is formulated by using a classifier trained with difficulty ratings of real-world trails given by bikers. This cost measures the difference between the perceived difficulty $D(P)$ of the generated path and the desired path difficulty target $\rho_D$. It is defined as:

$$C_D(\mathcal{P}) = 1 - \exp\left(-\left(\frac{D(\mathcal{P}) - \rho_D}{\sigma_D}\right)^2\right) \qquad \text{Eq. (7)}$$

where $\sigma_D = 0.25$ in some embodiments, and $D(\mathcal{P}) \in [0,1]$ is the perceived difficulty of path $\mathcal{P}$ evaluated using the classifier, with a larger value referring to a more difficult path.

To train a classifier to predict the difficulty of a path, more than 30,000 paths were collected from the MTB Project. The difficulty of a path is voted by MTB users. The difficulty ratings range from 1 to 6, with 1 meaning easy and 6 meaning hard. The number of votes for a path varies from 1 to 100. We dropped the paths with fewer than 10 votes.

The average difficulty of each path may be determined using votes corresponding to the path. The paths may then be grouped into two difficulty groups: easy and hard. The easy group contains paths with an average difficulty rating lower than 3. The hard group contains paths with an average difficulty rating higher than 4. Paths with an average difficulty rating between 3 and 4 may be ignored as their difficulty levels are ambiguous. Finally, 1,000 easy paths and 1,000 hard paths were obtained.

Figure 6:
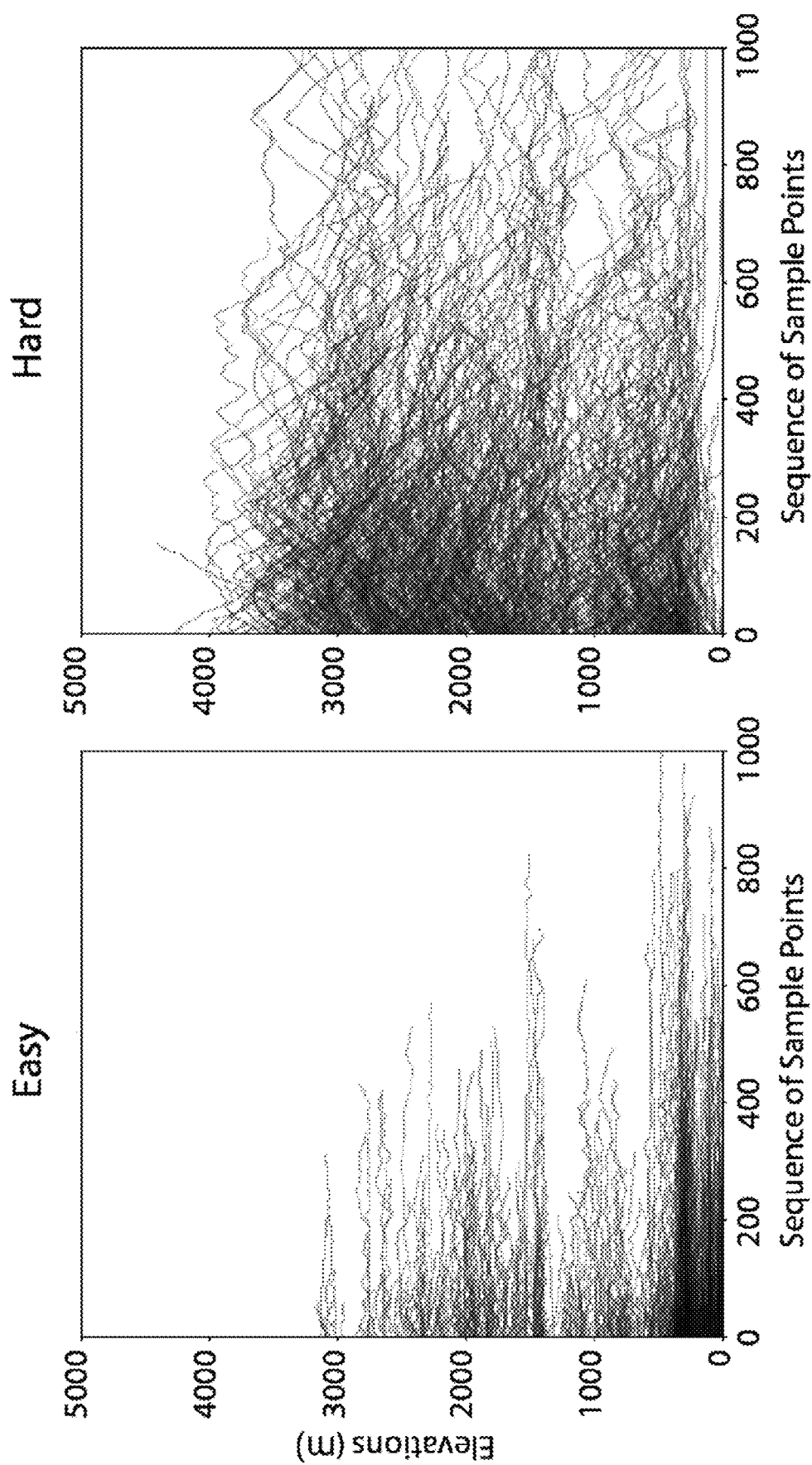
FIG. 6 depicts elevations of the paths from the easy and hard groups, in accordance with one or more embodiments of the present disclosure. The paths correspond to real-world trails of the MTB Project. The elevation along each path is shown. The hard paths are generally bumpier than the easy paths.
Figures 7A, 7B:
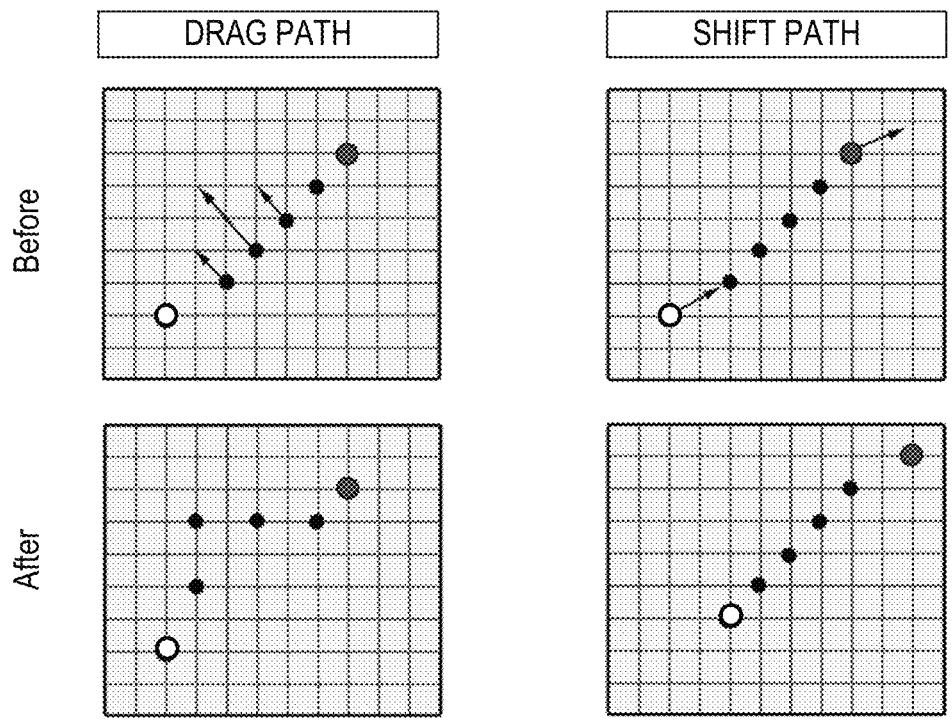
FIGS. 7A-7H depicts examples of respective move strategies to update a path, in accordance with one or more embodiments of the present disclosure. Each move is applied to the control points of the 2D Hermite curve $\mathcal{R}$ on the path grid. Arrows indicate respective moving directions of control points. Each move modifies curve $\mathcal{R}$, which in turn modifies path $\mathcal{P}$ on the 3D terrain, resulting in an updated path $\mathcal{P}'$. Specifically.
Figures 7C, 7D:
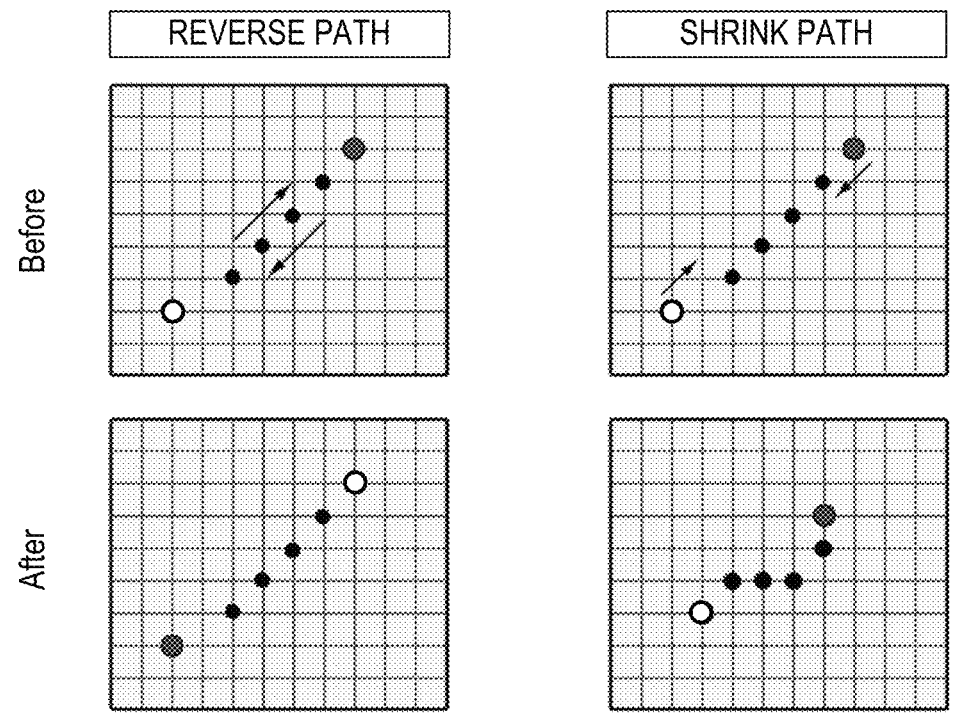
Figures 7E, 7F:
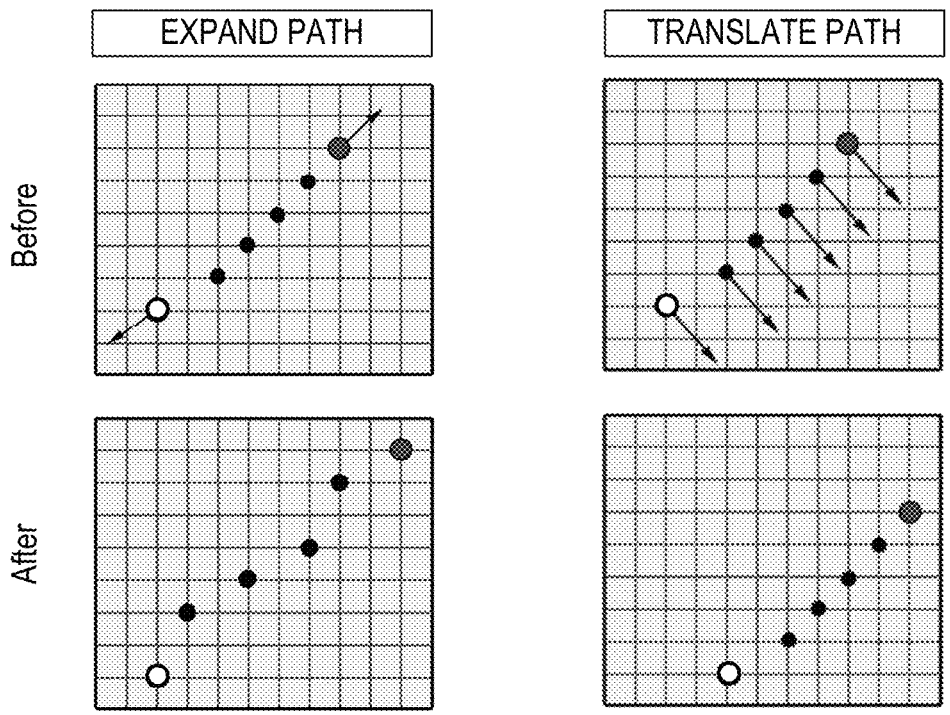
Figures 7G, 7H:
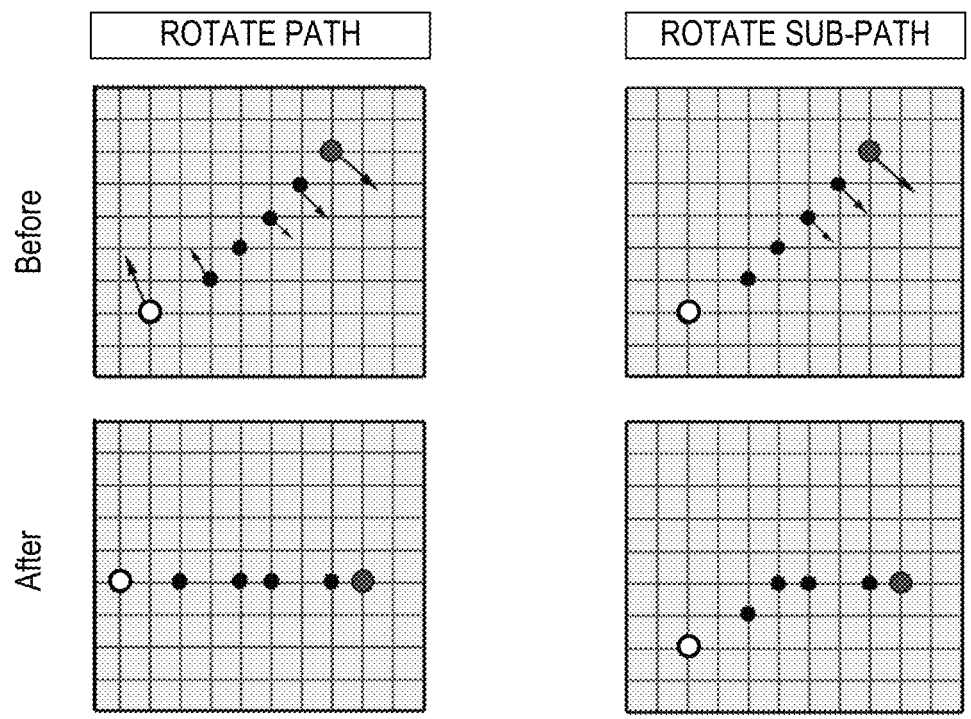

Each collected path is encoded as a sequence of sample points denoting the elevation along the path. In some embodiments, the number of sample points of a path varies from 100 to 1,000. A sample point can be taken approximately every 0.1 mile. The disclosure is not limited that range of sample points. FIG. 6 illustrates the two groups of paths. Visually, the hard paths tend to be bumpier than the easy paths.

As the paths have different lengths, to align the paths for training, a set of features can be extracted from each path. In some embodiments, the set of features includes 11 features:
 Path length;
 Highest and lowest elevations of the path;
 Sum of ascent (elevation increase) along the path;
 Sum of descent (elevation decrease) along the path;
 Minimum and maximum curvature;
 Accumulative curvature;
 Number of peaks and valleys; and
 Variance in the elevations of the sample points of the path.

A feedforward ANN can be trained to predict the difficulty of a path based on the foregoing features of the path. As mentioned, in some cases, the feedforward ANN embodies the classification model used to determine perceived difficulty of a path. Each feature was normalized to have a value within [0, 1]. That neural network has, in some embodiments, 1 hidden and fully-connected layer with 15 hidden units. In addition, that neural network can have 11 trainable parameters, and can use ReLU as the activation function and stochastic gradient descent (SGD) to minimize loss function. In some cases, 500 paths were randomly selected from each difficulty group to construct the training dataset, and the remaining paths were used as the testing data. The prediction accuracy of the classifier is about 82%. Each prediction also gives a probability that indicates how likely the input path is classified into the hard group. For example, if the probability of a given path is 0.2, it means that the path has a 20% chance to be classified as a hard path and a 80% chance to be classified as an easy path. This probability is used as the metric $D(\mathcal{P})$ to evaluate the difficulty of a generated path $\mathcal{P}$.

The path grid M is initialized to generate a random line, which contains a sequence of control points of a 2D Hermite curve, near the center of the grid. To ensure that the random line stays within the terrain boundary, both the target path length $\rho_L$ and the terrain width $\omega$ are considered. The coordinates of the center $(x_c, y_c)$ of the line are randomly initialized in the range $[\rho_L/2, \omega - \rho_L/2]$. By selecting a random angle $\phi \in [0, \pi]$, the start point of the line is generated as $(x_c - \rho_L/2 \cos(\phi), x_c - \rho_L/2 \sin(\phi))$ and the end point as $(x_c + \rho_L/2 \cos(\phi), x_c + \rho_L/2 \sin(\phi))$. The control points on this line are then used to construct a 2D Hermite curve $\mathcal{R}$ that is mapped to the 3D terrain to generate an initial path $\mathcal{P}$ described below.

The optimization proceeds iteratively. At each iteration, a move is applied to modify the control points of the 2D Hermite curve $\mathcal{R}$ so as to modify curve $\mathcal{R}$ and the path $\mathcal{P}$ on the 3D terrain. Again, control points are shown as black solid circles in each one of FIGS. 7A-7H. The move is randomly selected from one of the eight different types of moves shown in FIG. 7A to FIG. 7H:

Drag (FIG. 7A): Some control points in the middle are dragged aside by a random amount so that the curve is dragged like a spring.
 Shift (FIG. 7B): The first and last control points move forward or backward by a random amount so that the curve shifts like a snake.
 Reverse (FIG. 7C): The first and last points of the curve swap with each other, reversing the travel direction of the path.
 Shrink (FIG. 7D): The first and last control points move towards each other to shrink the curve.
 Expand (FIG. 7E): The first and last control points move away from each other to elongate the curve.
 Translate (FIG. 7F): All control points translate by the same amount along a random direction so that the curve translates.
 Rotate (FIG. 7G): The whole curve is rotated with a random angle.
 Rotate Sub-Path (FIG. 7H): A first portion of the curve is rotated with a random angle while a second portion of the curve stays.

To constrain the solution to be valid, a move is dropped if it results in a 2D Hermite curve that is out of the boundary of the path grid M or is self-colliding. Here, a self-colliding curve refers to a curve that intersects itself, resulting in a loop on the path grid M (see FIG. 3). To regularize the resulting curve to be smooth, a move also can be dropped if the resulting curve makes a sharp corner; that is, there exists control points $(x_{k-1}, y_{k-1})$, $(x_k, y_k)$, and $(x_{k+1}, y_{k+1})$ such that $[x_k - x_{k-1}, y_k - y_{k-1}] \cdot [x_{k+1} - x_k, y_{k+1} - y_k] > 0$.

In some embodiments, the Metropolis Hastings algorithm with a simulated annealing state searching step may be used to optimize the path. At each iteration, a new path $\mathcal{P}'$ is proposed by applying a randomly-selected move on the current path $\mathcal{P}$ as described above. The new path $\mathcal{P}'$ is accepted with a probability defined based on the Metropolis criterion:

$$Pr(\mathcal{P}' | \mathcal{P}) = \min\left(1, \frac{\gamma(\mathcal{P}')}{\gamma(\mathcal{P})}\right), \qquad \text{Eq. (8)}$$

where $\gamma(\mathcal{P})$ is a Boltzmann-like function comprising the total cost:

$$\gamma(P) = \exp\left(-\frac{1}{t} C_{total}(\mathcal{P})\right) \qquad \text{Eq. (9)}$$

and t is the temperature parameter of simulated annealing, which decreases from an initial high value (e.g., a value of 1) to a low value near zero over the iterations. The parameter t is the parameter introduced in Eq (5). In some implementations, a threshold value can be used to discriminate between an accepted update and a rejected update based on the probability $\Pr(\mathcal{P}|\mathcal{P}')$. Specifically, for example, $\Pr(\mathcal{P}|\mathcal{P}')$ greater than the threshold value results in acceptance of the update.

Essentially, the initial high temperature allows the optimizer to explore the solution space more aggressively with a high acceptance probability. As the temperature decreases over iterations, the optimizer becomes more greedy and it is less likely to accept worse paths than before. The optimization terminates if the absolute change in $\mathcal{C}_{total}(\mathcal{P})$ is smaller than a defined threshold (e.g., 3%) over a defined number of past iterations (e.g., past 50 iterations).

In some embodiments, the weights are set to as $w_L$=0.5, $w_W$=0.3, and $w_D$=0.2. The targets $\rho_L$, $\rho_W$, and $\rho_D$ are set according to the specific goals of the experiments.

With a generated path $\mathcal{P}$, a road along this path is generated on the terrain. An end-user can bike on this road in virtual reality. To make this road visually appealing and to deliver a natural and comfortable biking experience, coplanarity and horizontality may be incorporated from road construction engineering data when generating such a road. It is noted that the terrain also can be slightly refined when generating the road.

It is noted that in contrast to existing pathfinding techniques, the embodiments described herein can discretize the solution space in order to reduce the complexity of the optimization problem and to apply simulated annealing with flexible moves to extensively explore the solution space. In some cases, a path can be generated, via optimization, in a few minutes (in less than 5,000 iterations, for example).

With a generated path $\mathcal{P}$, a road can be generated along this path on the terrain. An end-user can bike on the generated road in virtual reality. Generating the road can include design aspects from road engineering, such as coplanarity and horizontality. As a result, the road that is generated can be visually appealing and can provide a natural and comfortable biking experience. The terrain that has been input for generation of the path $\mathcal{P}$ also can be refined as part of generating the road.

Figure 8:
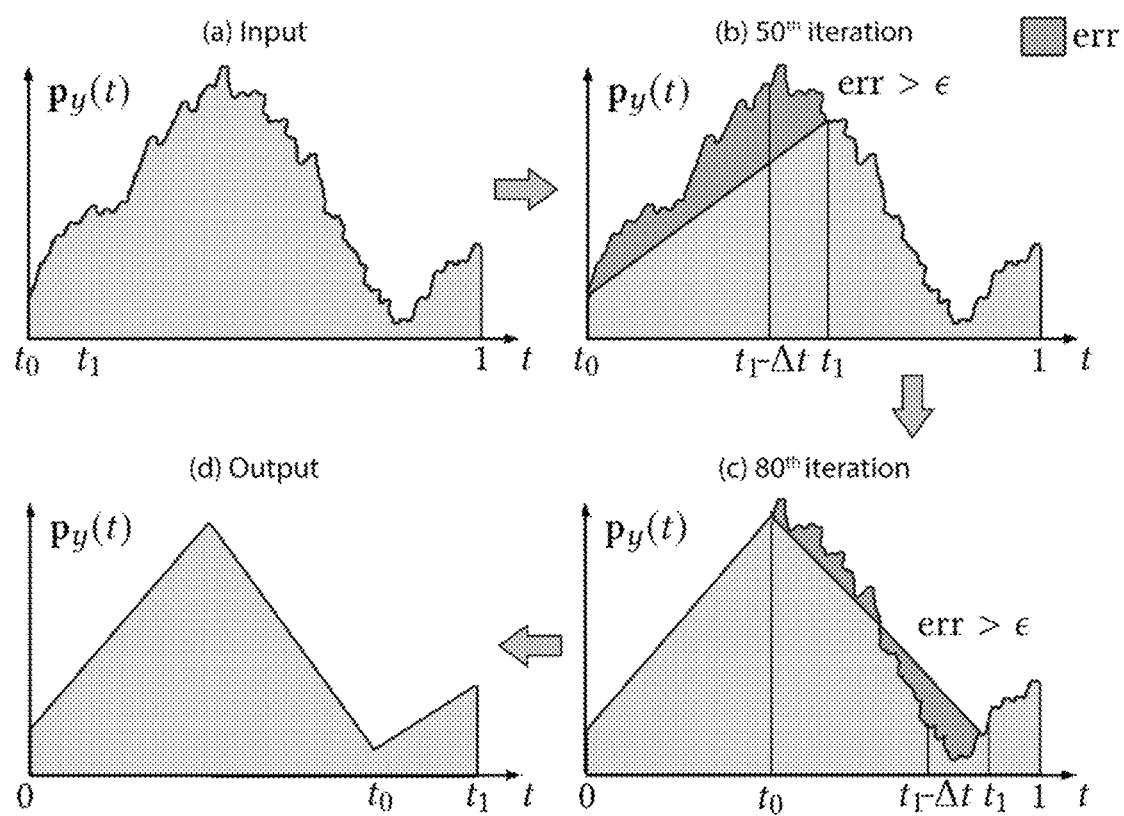
FIG. 8 depicts attaining high coplanarity of local road surfaces, in accordance with one or more embodiments of the present disclosure. At (a) input terrain that is bumpy. At (b) at the $50^{th}$ iteration, as the accumulated approximation error exceeds the threshold ϵ, the terrain between $t_0$ and $t_1-\Delta t$ is approximated by a linear segment. $t_0$ is then reset to $t_1-\Delta t$ to start searching for the next linear segment. At (c) at the $80^{th}$ iteration, as the accumulated error exceeds the threshold ϵ again, the next linear segment is formed. At (d) the output is an approximation of the input terrain by a series of linear segments.

FIG. 8 illustrates the effects of maintaining the coplanarity of local road surfaces. While path $\mathcal{P}$ is generated on the terrain whose surface could be bumpy, the road built on top of the path should be locally linear to prevent the user from biking up and down too frequently, which may result in dizziness. Such local linearity also suits the VR exercise bike hardware as it prevents the bike's force feedback from changing too frequently, which may wear out the motor otherwise.

One approach to achieving high coplanarity of local road surfaces is to approximate the path with a series of linear segments, each of which is associated with a coplanar road surface. To that end, a post-processing method can be applied to refine the elevation of the original path $\mathcal{P}$. A new path $\mathcal{P}'$ is formed which approximates the original path $\mathcal{P}$ by a number of linear segments. More specifically, the new path's elevation $p'_y(t)$ is an approximation of the original path's elevation $p_y(t)$. The new path $\mathcal{P}'$ can resemble the original path $\mathcal{P}$ by keeping key features of the original path, such as major turning points of the original path $\mathcal{P}$. The road can then be generated on top of the new path $\mathcal{P}'$.

The post-processing method can include, in some embodiments, two main operations: (1) extracting major turning points from the original path following Algorithm 1 as is shown in FIG. 21; and (2) linearly interpolating the extracted turning points to form a new path $\mathcal{P}'$ to approximate the original path $\mathcal{P}$. FIG. 8 illustrates this process.

Note that while the original path $\mathcal{P}$ may be used for deriving the costs, the new path $\mathcal{P}'$ may be used instead of the original path $\mathcal{P}$ to evaluate the path length cost in Eq. (2) and the total work cost in Eq. (4). That is, $\mathcal{C}_L(\mathcal{P}')$ and $\mathcal{C}_W(\mathcal{P}')$ are evaluated instead of $\mathcal{C}_L(\mathcal{P})$ and $\mathcal{C}_W(\mathcal{P})$ in optimizing the paths. Using P' for evaluating these costs is then more accurate. In cases where a designer computing device generates a road closely following the bumpy terrain and does not apply the post-processing method for linear approximation, for example, for simulating a vigorous mountain biking experience, the original path $\mathcal{P}$ can be used for evaluating those costs.

Figure 10:
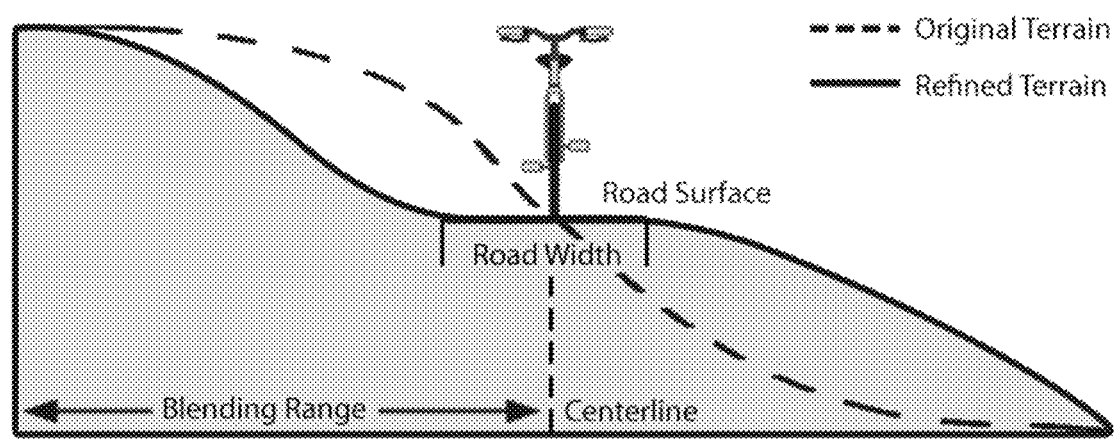
FIG. 10 depicts a schematic cross-section of a terrain that is refined to create a road surface with horizontal cross-slope, in accordance with one or more embodiments of the present disclosure.

As is shown in FIG. 10, a tilted road would cause a bike to slide or even flip on its side due to gravity. The cross slope of a road refers to the road's slope taken across the road's centerline. It is desirable to keep the cross slope of a road horizontal. Inspired by the geometric design of roads, such a consideration may be incorporated in creating a realistic road along the path for delivering a natural biking experience.

Figure 9:
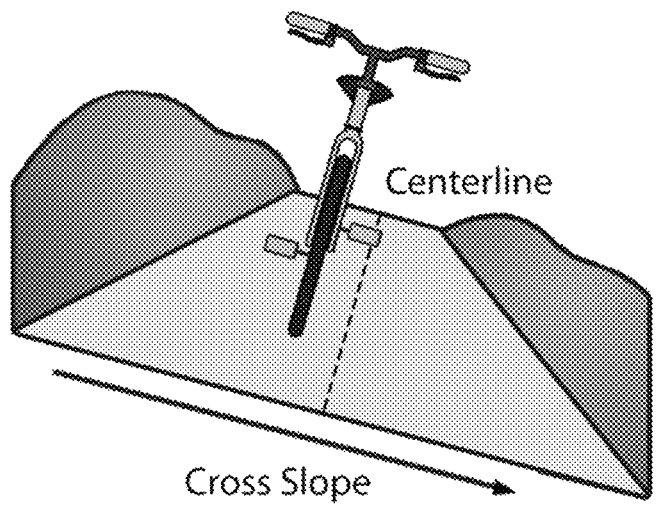
FIG. 9 depicts a road with tilted cross-slope, in accordance with one or more embodiments of the present disclosure.

To create a road with a horizontal cross slope, the terrain along the road can be slightly refined by applying a blending operation. More specifically, the blending operation can be defined by an α-map blending function to refine the input terrain's height map H(x, z) so that the terrain is flat along the cross slope of the road, and the sides (within a defined blending range, for example) of the road blend smoothly into the natural landscape. FIG. 9 depicts a schematic example of such a blending.

The road's cross slope may be made horizontal by setting the terrain near the center of the road to have the same height as the elevation of the path $\mathcal{P}'$. As the elevation of path $\mathcal{P}'$ is $p'_y(t)$, the new height map H'(x, z) of the terrain after blending is:

$$H'(x,z)=\alpha(x,z)p'_y(t^*(x,z))+(1-\alpha(x,z)H(x,z)) \qquad \text{Eq. (10)}$$

where $t^*(x, z)=\text{argmin}_t |r(t)-(x, z)|$ corresponds to the point r(t) on the 2D Hermite curve $\mathcal{R}$ that is closest to the point (x, z) on the xz-plane. Further, $d(x, z)=\min(|r(t)-(x, z)|)$ denotes the minimal distance from point (x, z) to the 2D Hermite curve $\mathcal{R}$. The α-map blending function α(x, z) is defined as:

$$\alpha(x,z) = \begin{cases} 1 & d(x,z) < w \\ 0 & d(x,z) > \kappa \\ \frac{1}{2}+\frac{1}{2}\cos\left(\frac{d(x,z)-w}{\kappa-w}\pi\right) & w \leq d(x,z) \leq \kappa \end{cases} \qquad \text{Eq. (11)}$$

where w is the road's half width and κ denotes a blending range. The blending decays from 1 to 0 as d(x, z) increases from w to κ.

Numerous types of computing systems can be utilized to generate an exertion-aware path in aware with aspects of this disclosure. In some embodiments, a development computing system can be embodied in, or can include, an Intel Core i7-9700 central processing unit (CPU), an NVIDIA GeForce RTX 2070 graphics card and 32 GM of RAM, as well as various peripheral devices, such as a display device, keyboard, mouse, and the like. The development computing system also can include an operating system (O/S) and a software development environment (SDE) for one or more programming languages, such as Python, etc. A path can be optimized in about 1,000 to 5,000 iterations, depending on input terrain and the specified exertion targets which may affect the optimization difficulty. A path can be generated, via the optimization described herein, in about 1 to 5 minutes in some cases.

In some embodiments, the development computing system may be part of, as used as, a VR computing system. In other embodiments, the VR computing system may be separate from the development computing system. Whether or not the VR computing system includes the development computing system, the VR computing system can execute an exergaming session that provides, for example, a biking road generated in accordance with aspects described herein. The VR computing system can include a VR computer, a processing unit (such as a microprocessor or another type of processor), a VR HMD that is configured to deliver at least visual data, and a VR bike that is configured to deliver the haptic feedback. In some embodiments, the VR HMD can be embodied in one or many commercially available VR headsets.

Figure 11:
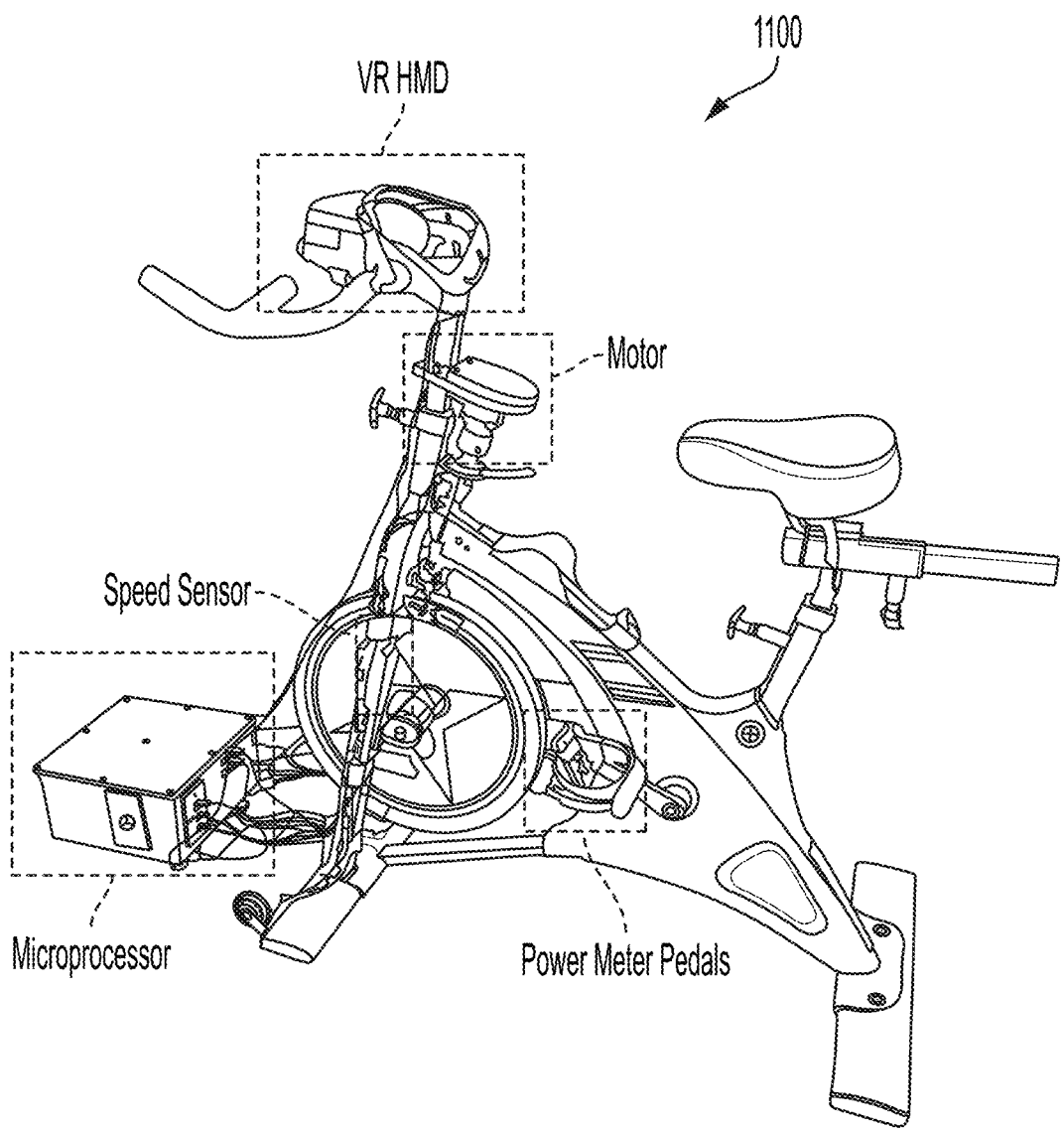
FIG. 11 depicts a custom-built bike, in accordance with one or more embodiments of the present disclosure.

FIG. 11 illustrates an example of a VR bike 1100 built based on a Schwinn Evolution SR Indoor Cycle Bike. A microprocessor embodied in an Arduino MEGA2560 R3, for example, serves to control a stepper motor that can adjust the resistance, and sensors may be used to monitor the cadence of traversal of a road generated based on a generated path.

The resistance level of the original bike could be adjusted by turning the resistance control knob, which in the VR bike 1100 may be replaced with a stepper motor controlled by the microprocessor. Then the microprocessor could adjust the resistance according to the elevation angle of the generated path to provide a desired feedback force.

In one embodiment, a reed switch can be mounted on the bike's frame near the wheel to measure speed. Two magnets can be attached to the wheel, triggering the reed switch when the passes through the two magnets. Such an arrangement can permit the microprocessor to measure speed. The microprocessor can send speed data to the VR computer through serial ports, for example, so that the VR program could move the user's bike in virtual reality according to the measured speed.

To validate effectiveness, the pedals of the VR bike 1100 can be embodied in power meter pedals (such as PowerTap P1S). In an example single-sided configuration, the left pedal was used for measuring the power output of a user as he was biking. One embodiment of the VR bike 1100 allowed a total of 10 levels of feedback forces. In some embodiments, the first three levels were dropped as the forces were very small and almost identical, and the last level was also dropped as it was very heavy to ride. FIG. 5 (bottom panel) illustrates the magnitudes of the levels of feedback forces used. The disclosure is not limited to 10 levels of feedback force and, in some cases, fewer or more than 10 levels can be used. For instance, in some embodiments, 20 levels of feedback forces can be implemented.

To conduct experiments, different terrains were generated including a Rocky Hill, a Terrace Hill, and a Desert Hill. In some cases, a terrain generator may be used, such as World Creator, which can generate, design, blend, mix, paint sculpt, erode and simulate realistic terrains, to generate the height maps of the terrains. As one feature of the World Creator, different types of terrains can be generated through different filters that carry specific geological properties. For example, the Rocky Hill was generated using the canyon filter, rocky-hills filter, smooth slope filter, and the zero-edge filter.

For realistic rendering, the appearance of the terrain was simulated using three different levels of textures, namely, the road texture, the plain texture, and the mountain texture. An alpha blending function, similar to that described above, may be used to blend the road texture smoothly into the texture of the natural landscape (e.g., mountain or plain) near the sides of the road.

A path $\mathcal{P}'$ that approximates the original path $\mathcal{P}$ by a number of linear segments, as is described hereinbefore, may not be smooth, resulting in corners between linear segments. While the elevation angles from path $\mathcal{P}'$ may be used to control the discrete feedback force of the VR bike, for visual appeal only, the corners can be smoothed by fitting small quadratic Bézier curves at the corners. Other forms of smoothing using different fitting functions also can be implemented.

In some embodiments, paths were optimized on three different terrains. Each generation of a path used the same path length target $\rho_L = 2,500$ m. The paths were generated using four combinations of exertion goals:

(1) Easy and Low Work ($\rho_D = 0.2$, $\rho_W = 15$ kJ);
(2) Easy and High Work ($\rho_D = 0.2$, $\rho_W = 30$ kJ);
(3) Hard and Low Work ($\rho_D = 0.8$, $\rho_W = 15$ kJ); and
(4) Hard and High Work ($\rho_D = 0.8$, $\rho_W = 30$ kJ).

Figure 12A:
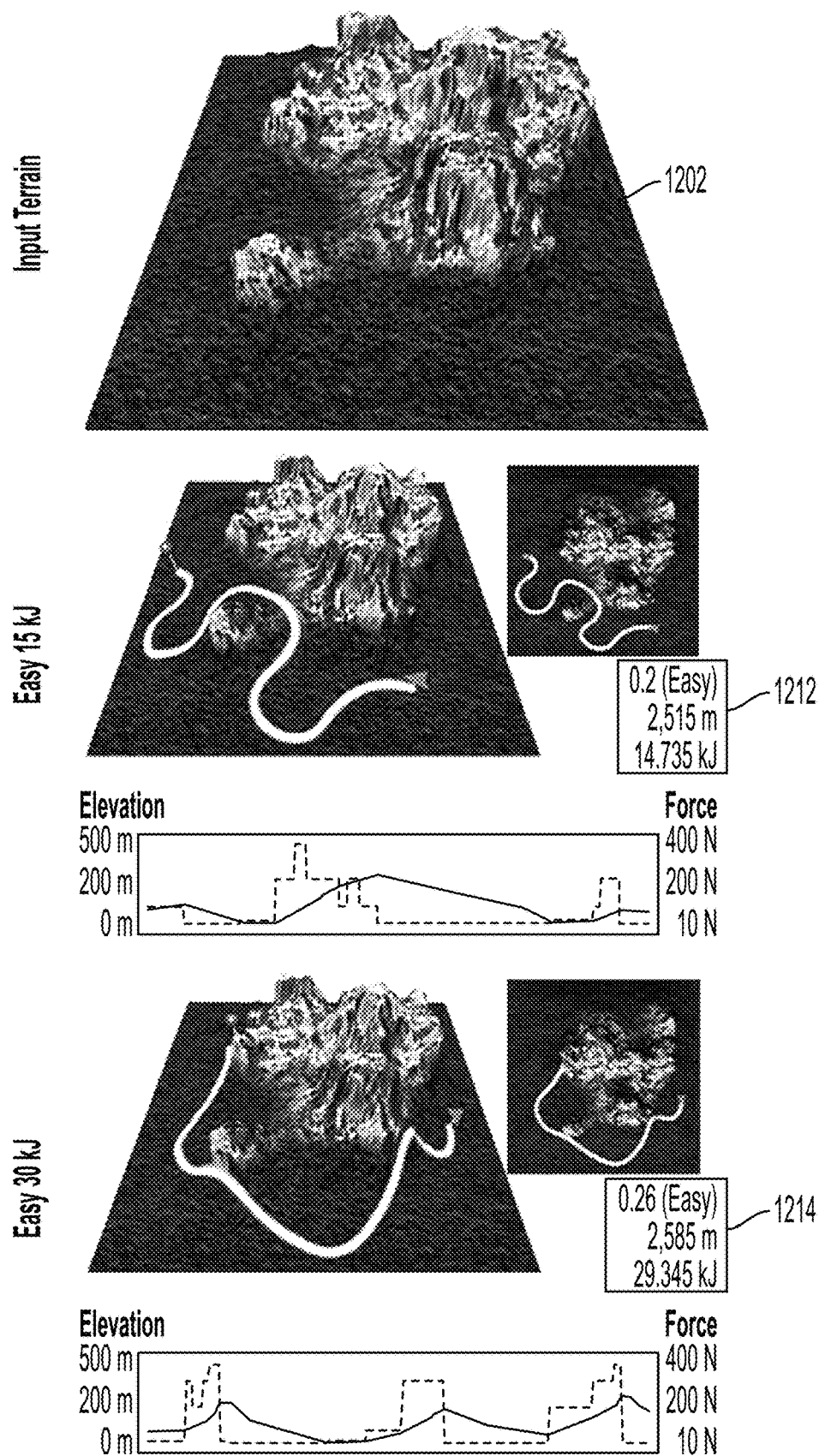
FIGS. 12A-12C depict respective paths generated on different terrains with different exertion goals, in accordance with one or more embodiments of the present disclosure. In each row, the path difficulty target (e.g., easy) and total work target (e.g., 15 kJ) are shown on the left side of the page. The path length target is 2,500 m for all three paths. The path difficulty, path length, total work after path optimization has converged, as well as the elevation and feedback force plots of each generated path are shown. A triangle marking and a pin marking identify the start point and end point respectively. Specifically.
Figure 12A:
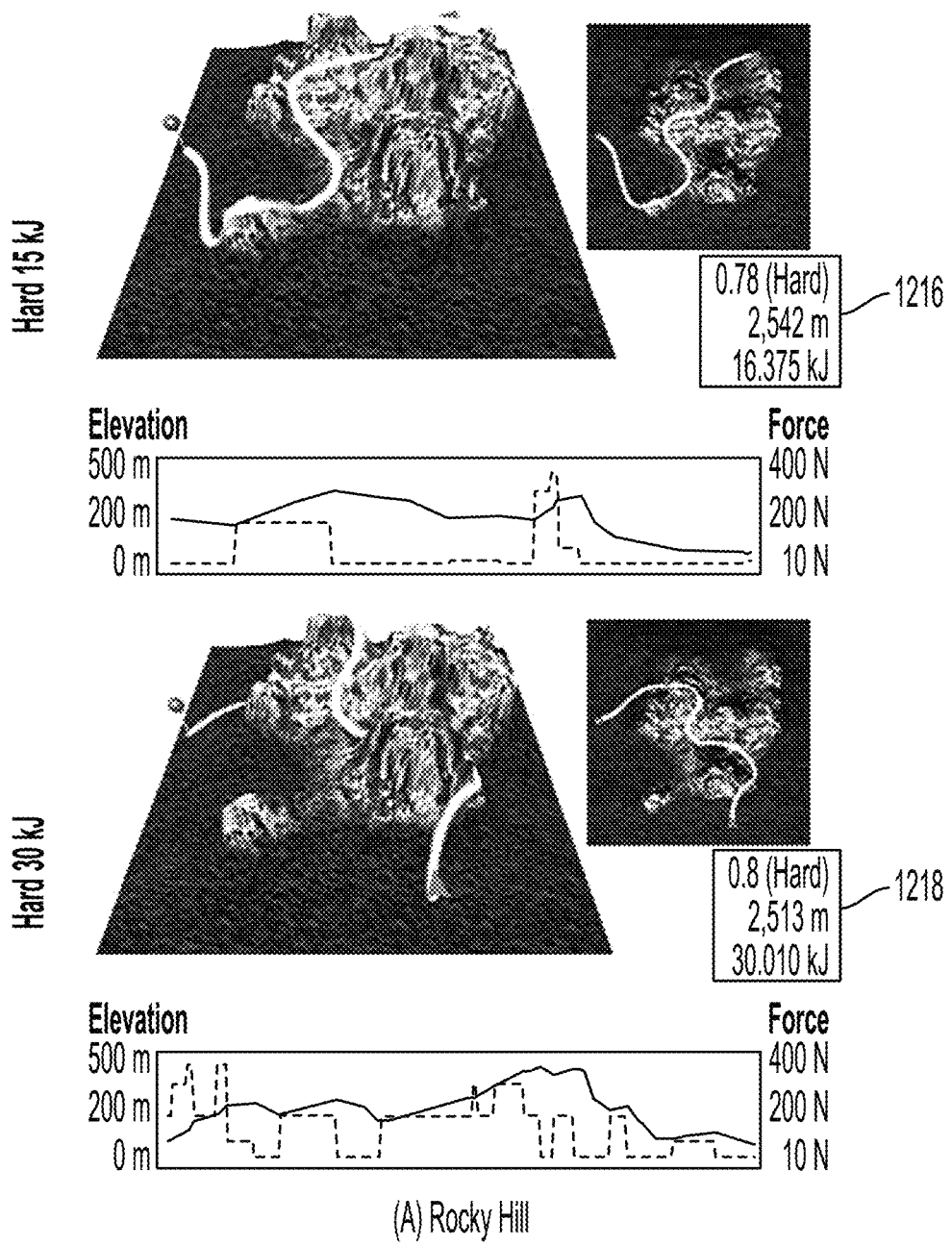
Figure 12B:
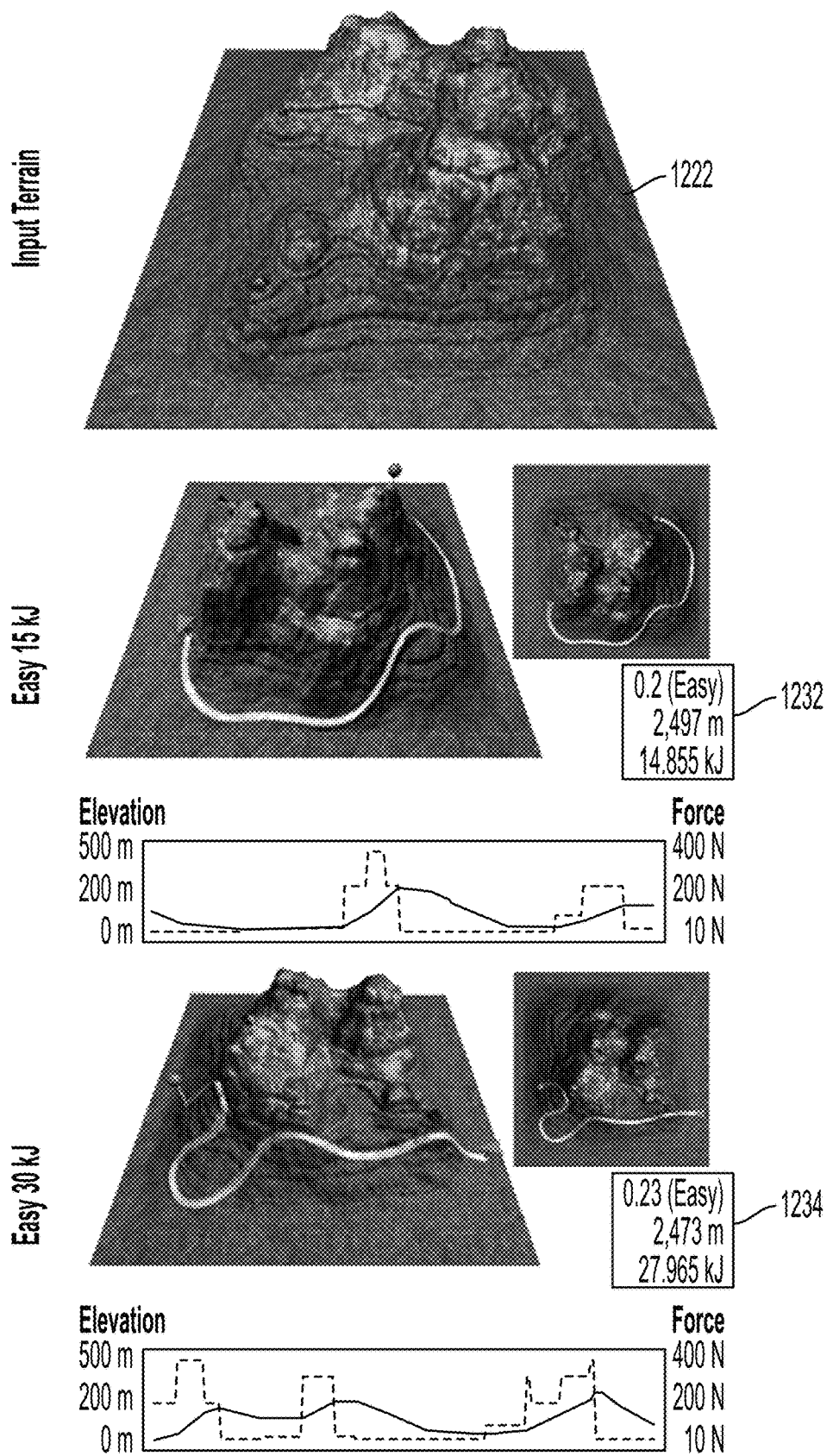
Figure 12B:
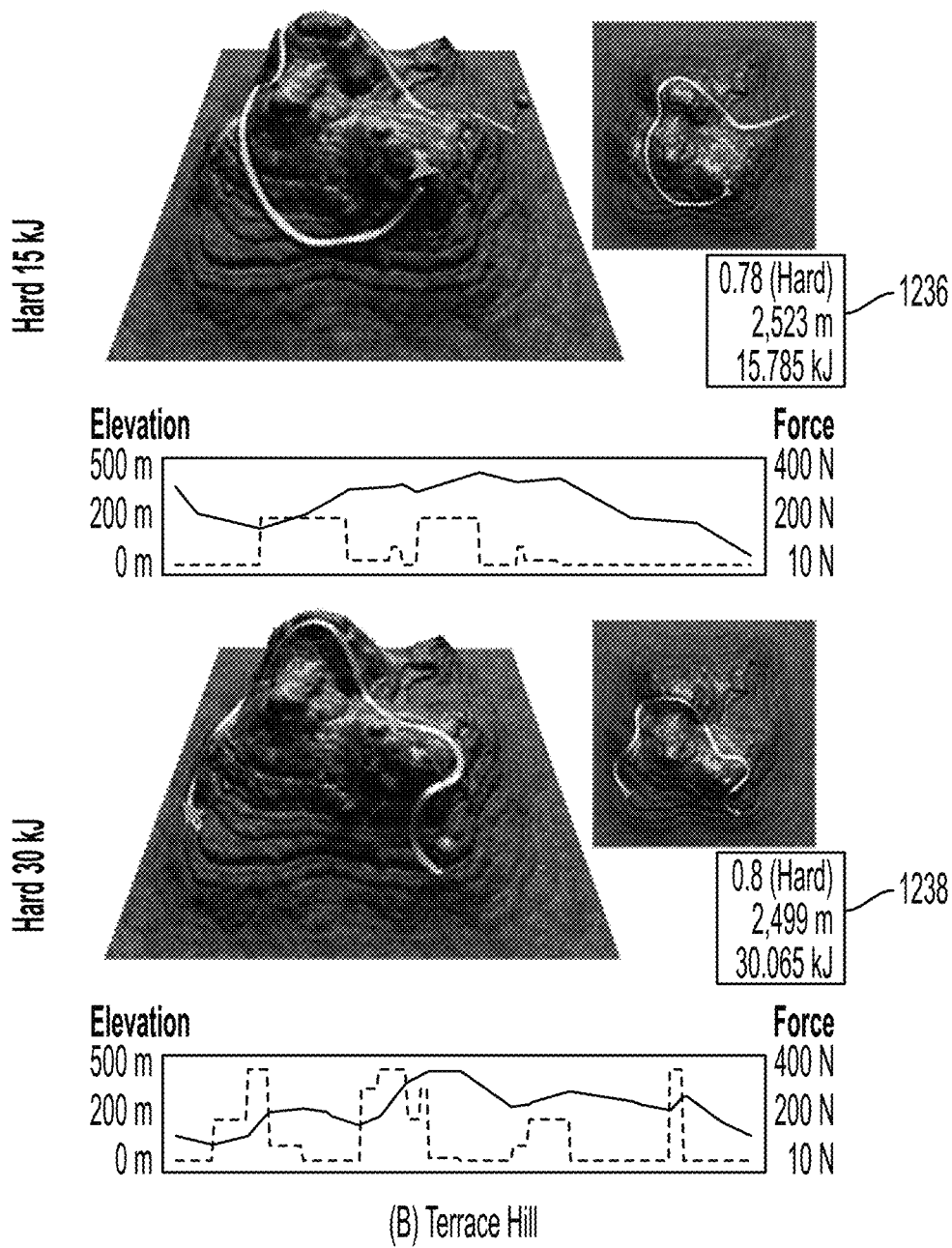
Figure 12C:
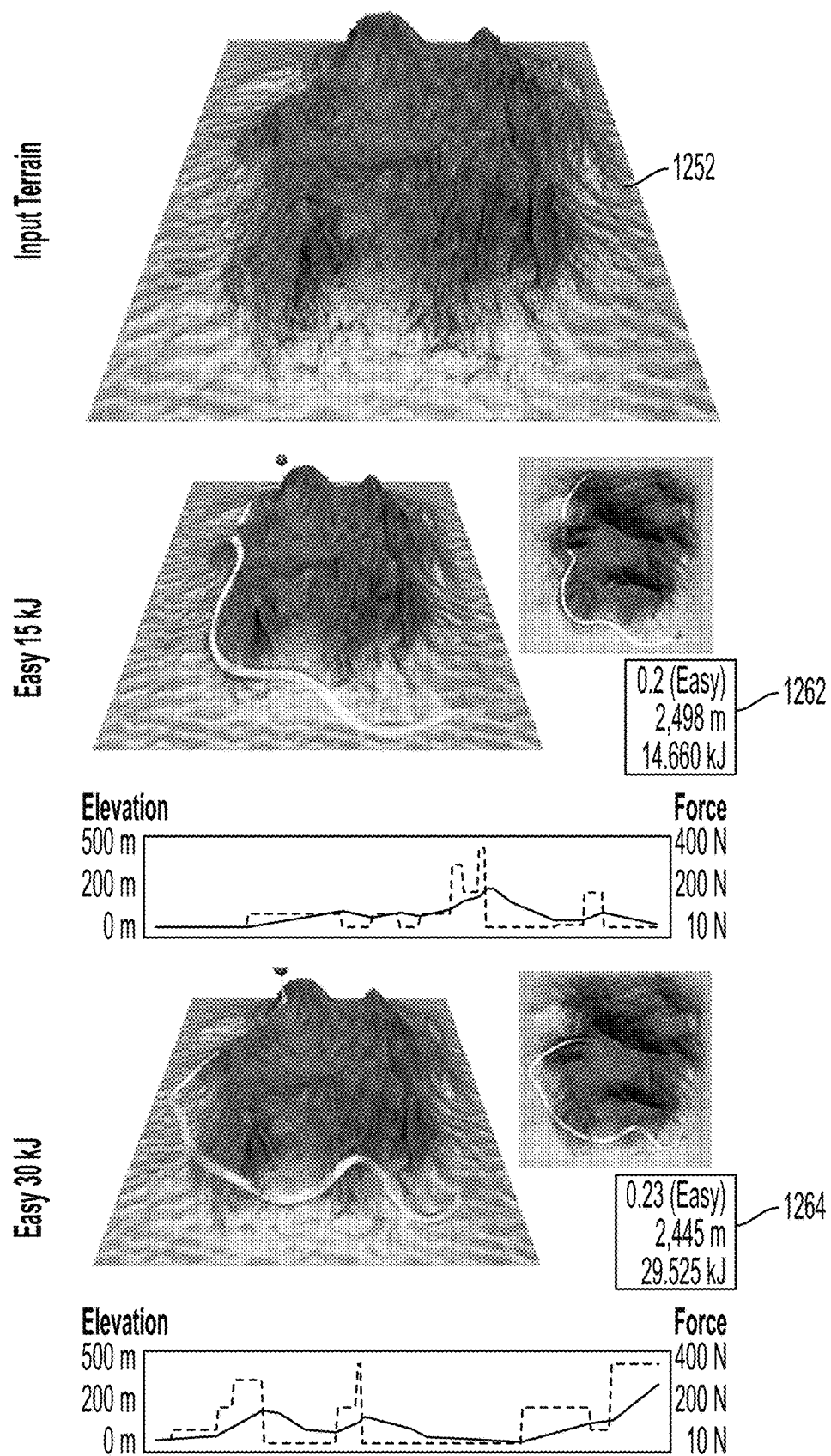
Figure 12C:
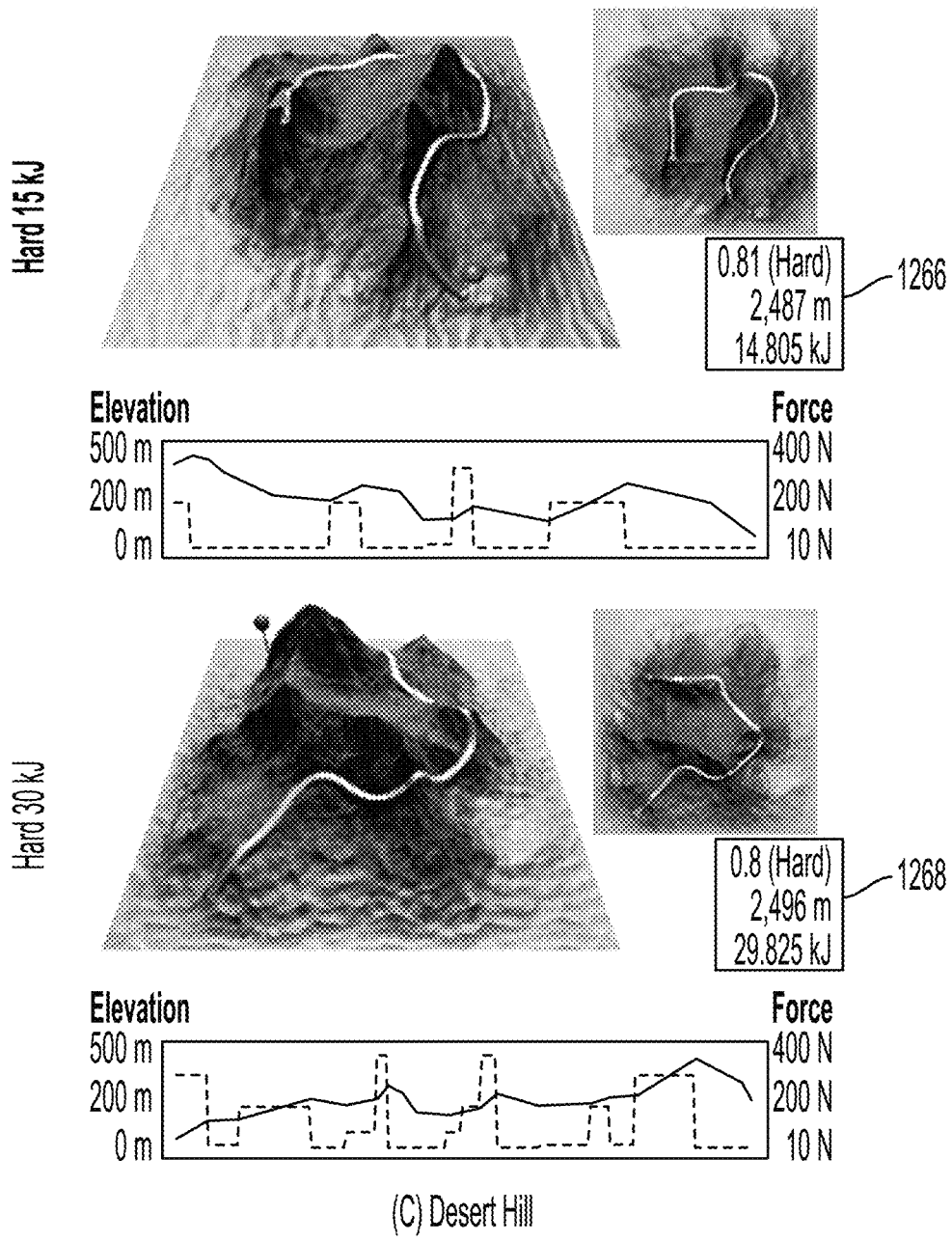

FIGS. 12A-12C illustrate the respective terrains and the respective generated paths. All generated paths have a length which is close to the path length target of 2,500 m. As the plots below each sub-figure show, the feedback force (dashed line) pattern changes with the path elevation (solid line) correspondingly. The paths generated with larger total work targets tend to have larger average forces than the ones generated with smaller targets. On the other hand, given the same total work target, paths generated with different path difficulties tend to have different distributions on the same terrain: easy paths tend to lie on the plain area where the elevations vary in smaller scales; hard paths tend to lie on the mountainsides where the elevations vary in larger scales. User studies can be conducted based on some of these generated paths. Results of example user studies are discussed hereinafter.

More specifically, with respect to FIG. 12A, the terrain 1202 is referred to as Rocky Hill, simply for the sake of nomenclature. Further, block 1212 presents path difficulty, path length, and total work after path optimization for the foregoing exertion goal (1) Easy and Low Work has converged (e.g., termination criterion for iterative optimization has been satisfied). The path difficulty is 0.2 (corresponding to an Easy classification); the path length is 2515 m; and the total work is 14.735 kJ. Further, block 1214 presents path difficulty, path length, and total work after path optimization for the foregoing exertion goal (2) Easy and High Work has converged. The path difficulty is 0.26 (corresponding to an Easy classification); the path length is 2585 m; and the total work is 29.345 kJ. Further, block 1216 presents path difficulty, path length, and total work after path optimization for exertion goal (3) Hard and Low Work has converged. The path difficulty is 0.78 (corresponding to a Hard classification); the path length is 2542 m; and the total work is 16.375 kJ. Further, block 1218 presents path difficulty, path length, and total work after path optimization for exertion goal (4) Hard and High Work has converged. The path difficulty is 0.8 (corresponding to a Hard classification); the path length is 2513 m; and the total work is 30.010 kJ.

With respect to FIG. 12B, the terrain 1222 is referred to as Terrace Hill, simply for the sake of nomenclature. Further, block 1232 presents path difficulty, path length, and total work after path optimization for the foregoing exertion goal (1) Easy and Low Work has converged (e.g., termination criterion for iterative optimization has been satisfied). The path difficulty is 0.2 (corresponding to an Easy classification); the path length is 2497 m; and the total work is 14.855 kJ. Further, block 1234 presents path difficulty, path length, and total work after path optimization for the foregoing exertion goal (2) Easy and High Work has converged. The path difficulty is 0.23 (corresponding to an Easy classification); the path length is 2473 m; and the total work is 27.965 kJ. Further, block 1236 presents path difficulty, path length, and total work after path optimization for exertion goal (3) Hard and Low Work has converged. The path difficulty is 0.78 (corresponding to a Hard classification); the path length is 2523 m; and the total work is 15.785 kJ. Further, block 1238 presents path difficulty, path length, and total work after path optimization for exertion goal (4) Hard and High Work has converged. The path difficulty is 0.8 (corresponding to a Hard classification); the path length is 2499 m; and the total work is 30.065 kJ.

With respect to FIG. 12C, the terrain 1252 is referred to as Desert Hill, simply for the sake of nomenclature. Further, block 1262 presents path difficulty, path length, and total work after path optimization for the foregoing exertion goal (1) Easy and Low Work has converged (e.g., termination criterion for iterative optimization has been satisfied). The path difficulty is 0.2 (corresponding to an Easy classification); the path length is 2498 m; and the total work is 14.660 kJ. Further, block 1264 presents path difficulty, path length, and total work after path optimization for the foregoing exertion goal (2) Easy and High Work has converged. The path difficulty is 0.23 (corresponding to an Easy classification); the path length is 2445 m; and the total work is 27.525 kJ. Further, block 1266 presents path difficulty, path length, and total work after path optimization for exertion goal (3) Hard and Low Work has converged. The path difficulty is 0.81 (corresponding to a Hard classification); the path length is 2487 m; and the total work is 14.805 kJ. Further, block 1268 presents path difficulty, path length, and total work after path optimization for exertion goal (4) Hard and High Work has converged. The path difficulty is 0.8 (corresponding to a Hard classification); the path length is 2496 m; and the total work is 29.825 kJ.

Figure 13:
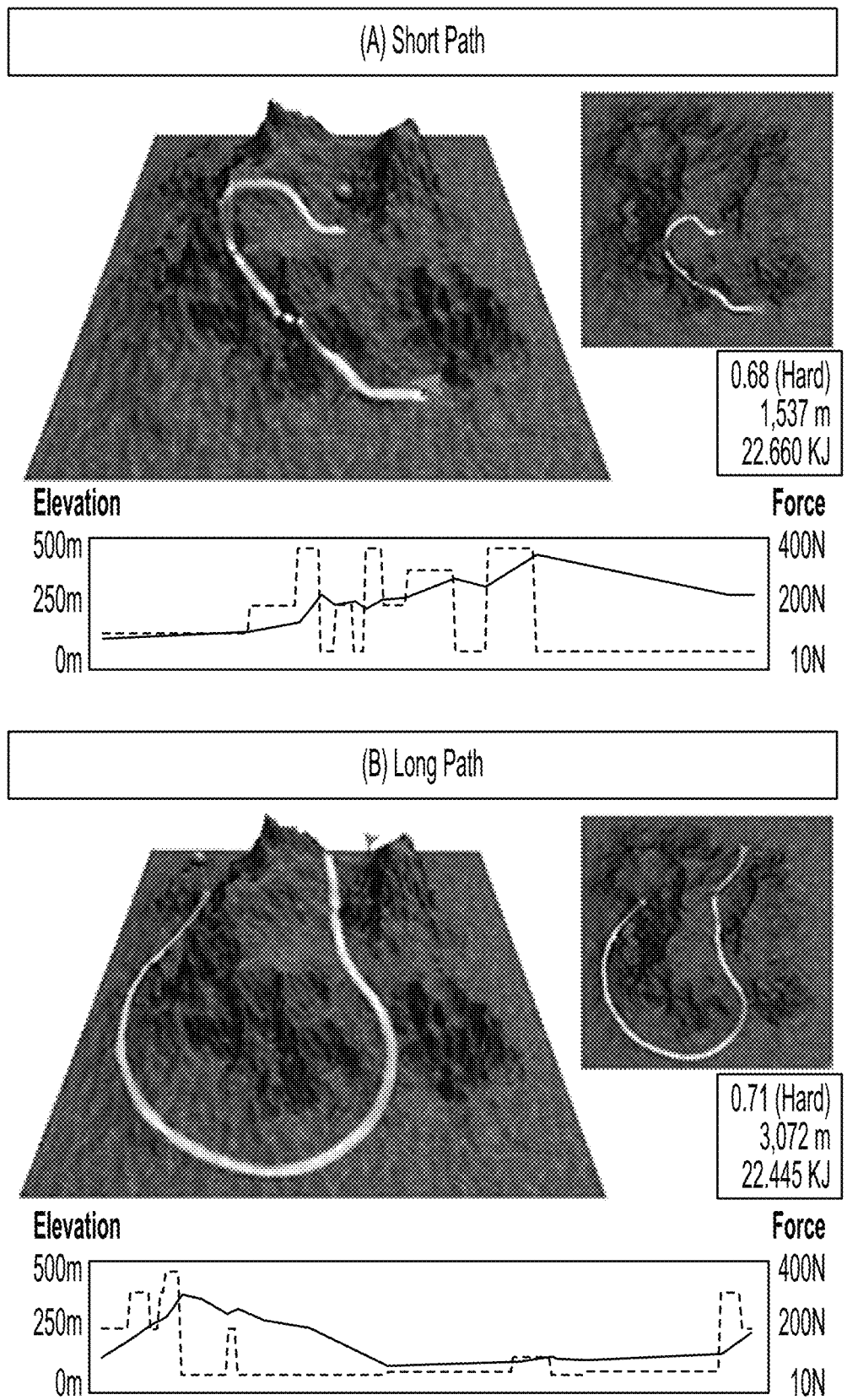
FIG. 13 depicts a long path and a short path generated using long and short path length targets on the same input terrain, in accordance with one or more embodiments of the present disclosure. Both paths used the same total work target $\rho_W$=22.5 kJ. This approach generates (a) a short uphill path which is more intensive; and (b) a long downhill path which is less intensive. Feedback force is shown as a dashed line and elevation is shown as a solid line. A triangle marking and a pin marking identify the start point and end point respectively.

FIG. 13 illustrates a short path and a long path generated using a short and long path length target, respectively. The input terrain is called Corner Hill. The short path and long path were generated with a target of $\rho_L=1,500$ m and $\rho_L=3,000$ m respectively. The same total work target of $\rho_W=22.5$ kJ was used for both paths. As the results show, to achieve the same amount of total work, the short path is more intensive in terms of force requirement as it goes uphill while the long path is less intensive as it goes downhill mostly. Feedback force is shown as a dashed line and elevation is shown as a solid line. In each Figure, a triangle marking and a pin marking identify the start point and end point respectively.

Figure 14:
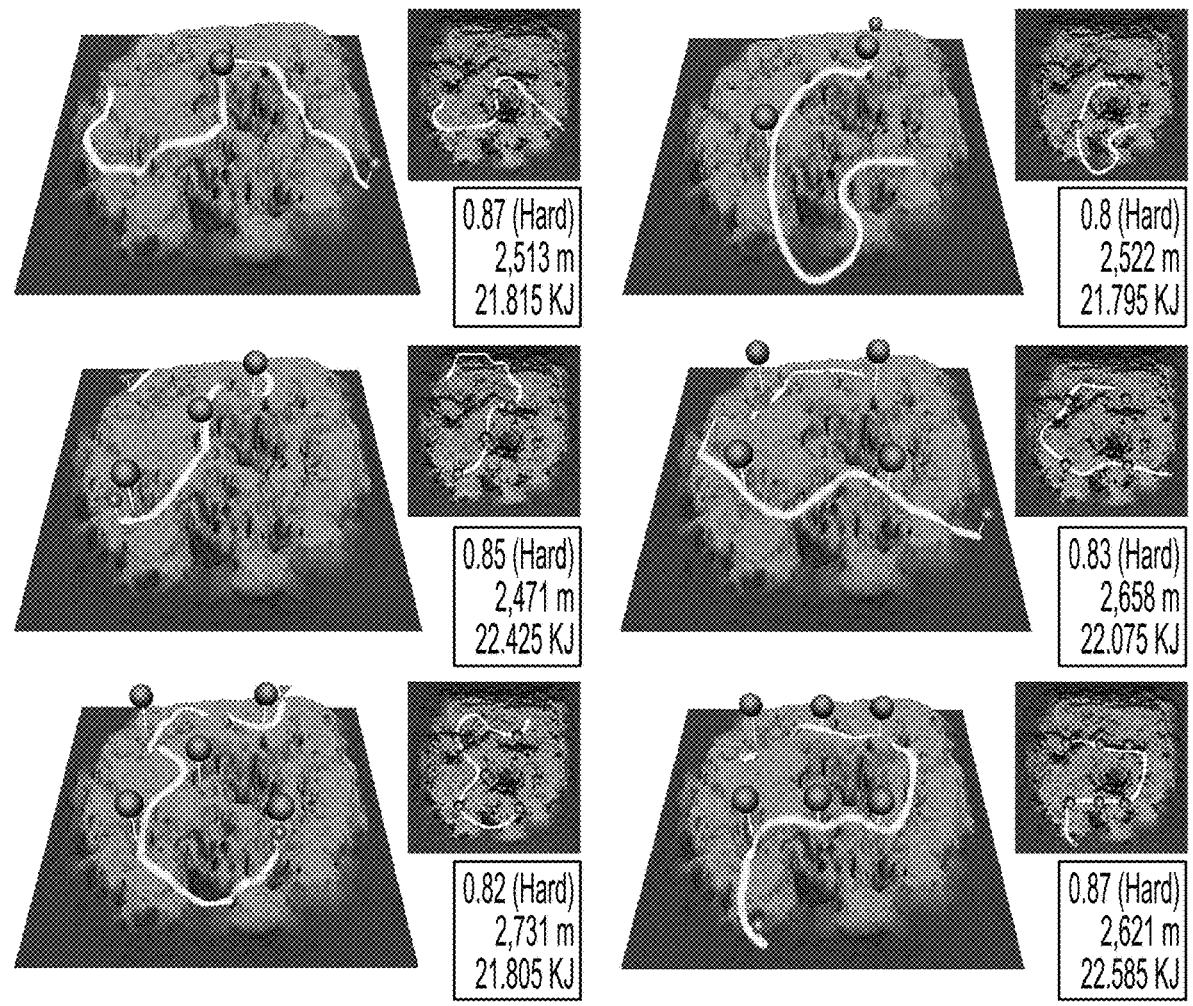
FIG. 14 depicts paths generated with specified landmarks (denoted by respective pins having a small spherical end), in accordance with one or more embodiments of the present disclosure. All paths were generated with the same path length target $\rho_L$=2,500 m and total work target $\rho_L$=22.5 kJ. The generated paths pass the landmarks closely. In each path, a triangle marking and a pin marking identify the start point and end point respectively.

FIG. 14 illustrates paths generated by specifying landmarks on the terrain that the paths should pass. The input terrain is called Sandy Hill, simply for the sake of nomenclature. A landmark is pictorially represented by a pin having a spherical end. As is shown in FIG. 14. the landmarks follow the dot patterns on the six faces of a dice. The paths were generated with the same path length target $\rho_L=2,500$ m and the same total work target $\rho_L=22.5$ kJ.

The formulation may be extended by adding a landmark cost that encourages a generated path to pass a defined group of landmarks. Denote the positions of the group of landmarks on the 3D terrain as $\{(x_i, y_i, z_i)\}$. The landmark cost $C_K(p)$ is defined as:

$$C_K(p) = 1 - \exp\left(-\left(\frac{1}{\sigma_K \omega K}\sum_{i=1}^{K} d(x_i, z_i)\right)^2\right), \quad \text{Eq. (12)}$$

where $d(x_i, z_i)$ denotes the minimal distance, defined in Eq. (11), between landmark i and the 2D Hermite curve $\mathcal{R}$ on the xz-plane; K indicates the number of landmarks used; $\omega$ is the width of the terrain; and $\sigma_K$ is an adjustable parameter that can be set to 0.25 in some embodiments. As FIG. 14 illustrates, the generated paths pass the landmarks either exactly or very closely.

Figure 16:
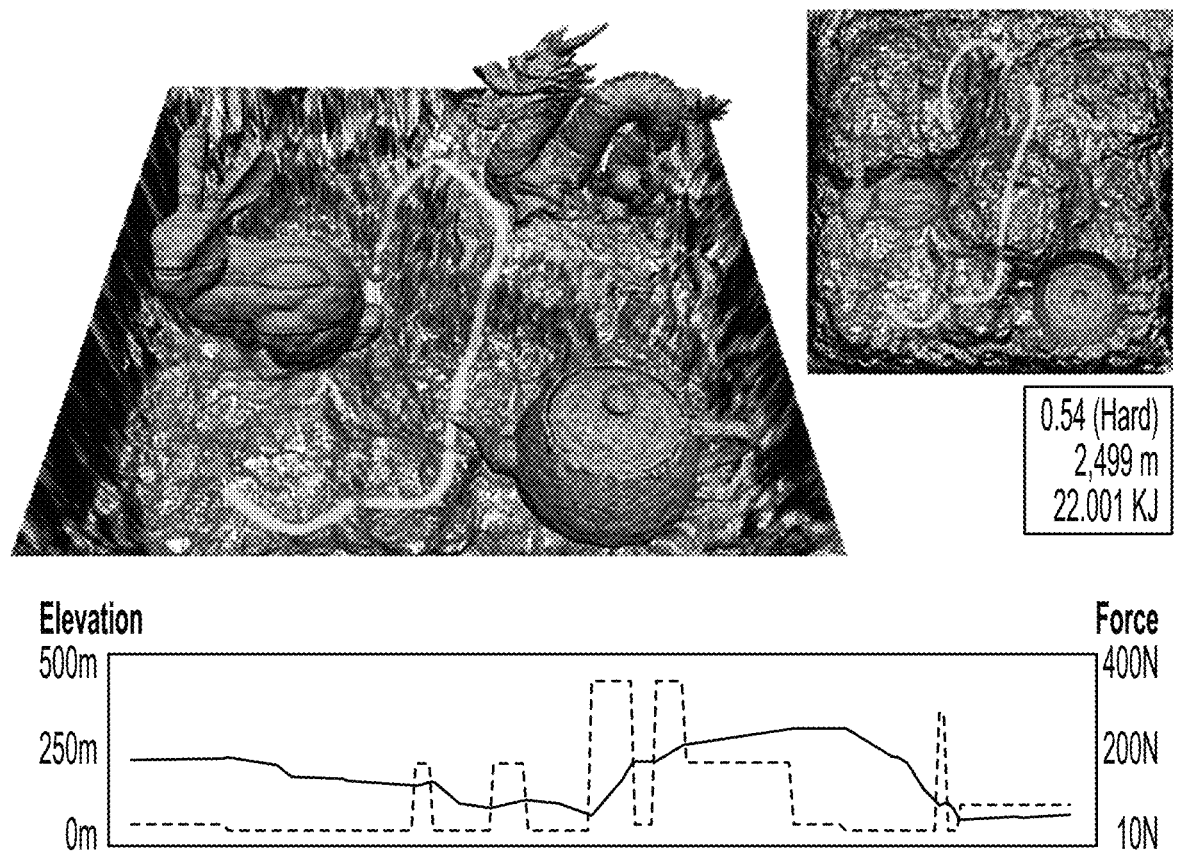
FIG. 16 depicts paths generated with the avoidance of specified obstacles (e.g., a bunny-shaped structure, a dragon-shaped structure, and a teapot-shaped structure), in accordance with one or more embodiments of the present disclosure. Feedback force is shown as a dashed line and elevation is shown as a solid line. A triangle marking and a pin marking identify the start point and end point respectively.

FIG. 15 illustrates paths generated with the avoidance of forbidden zones referring to sea water. The input terrain is called Island Hill. The sea water covers the land according to the sea level. The paths were generated with the same path length target $\rho_L=2,500$ m and the same total work target $\rho_L=22.5$ kJ. Such a consideration was enabled by adding a forbidden zone cost CF(p) defined as:

$$C_F(p) = 1 - \exp\left(-\left(\frac{1}{\sigma_F}\frac{\int_\mathcal{P} \Gamma(p)dp}{\int_\mathcal{P} dp}\right)^2\right), \quad \text{Eq. (12)}$$

where $\Gamma(p)=1$ if path p is below the sea level and $\Gamma(p)=0$ otherwise; and $\sigma_F$ is an adjustable parameter that can be set to 0.25 in some embodiments. The forbidden zone cost penalizes if path p enters the forbidden zones. Feedback force is shown as a dashed line, elevation is shown as a solid line, and sea level is shown as a dotted line. As FIG. 15 illustrates, the generated paths avoid getting into the sea water. In some embodiments, the designer could manually specify obstacles to be avoided on a terrain. FIG. 16 illustrates an example using the same path length and total work targets. Again, feedback force is shown as a dashed line and elevation is shown as a solid line. In FIG. 16, the generated path avoids a trio of specified obstacles—e.g., a bunny-shaped structure, a dragon-shaped structure, and a teapot-shaped structure. The obstacles can be specified by input information received at a designer computing system from an end-user.

User study experiments were conducted to test the enjoyment and exertion induced on users by the generated paths. The experiments were done with a HMD VR headset and a custom-built VR bike (e.g., VR bike 1100 shown in FIG. 11), which were connected to an Alienware laptop showing the generated paths in a game-like setting. The laptop was equipped with an Intel Core i7-8750H CPU, an NVIDIA GeForce GTX 1070 graphics card, and 16 GB of memory. The VR headset was the Oculus Rift, which used an OLED screen with 2,160×1,200 resolution at 90 Hz. The VR bike allowed the program to change its feedback force and monitor its cadence and power output while a user was biking.

The descriptive statistics on the participants' performance were examined using a Friedman Test to detect if there was an overall difference across the three different modes. Wilcoxon signed-rank tests were conducted to pinpoint where the difference was located in each pair of modes (e.g., VR-TV pair).

Figure 17:
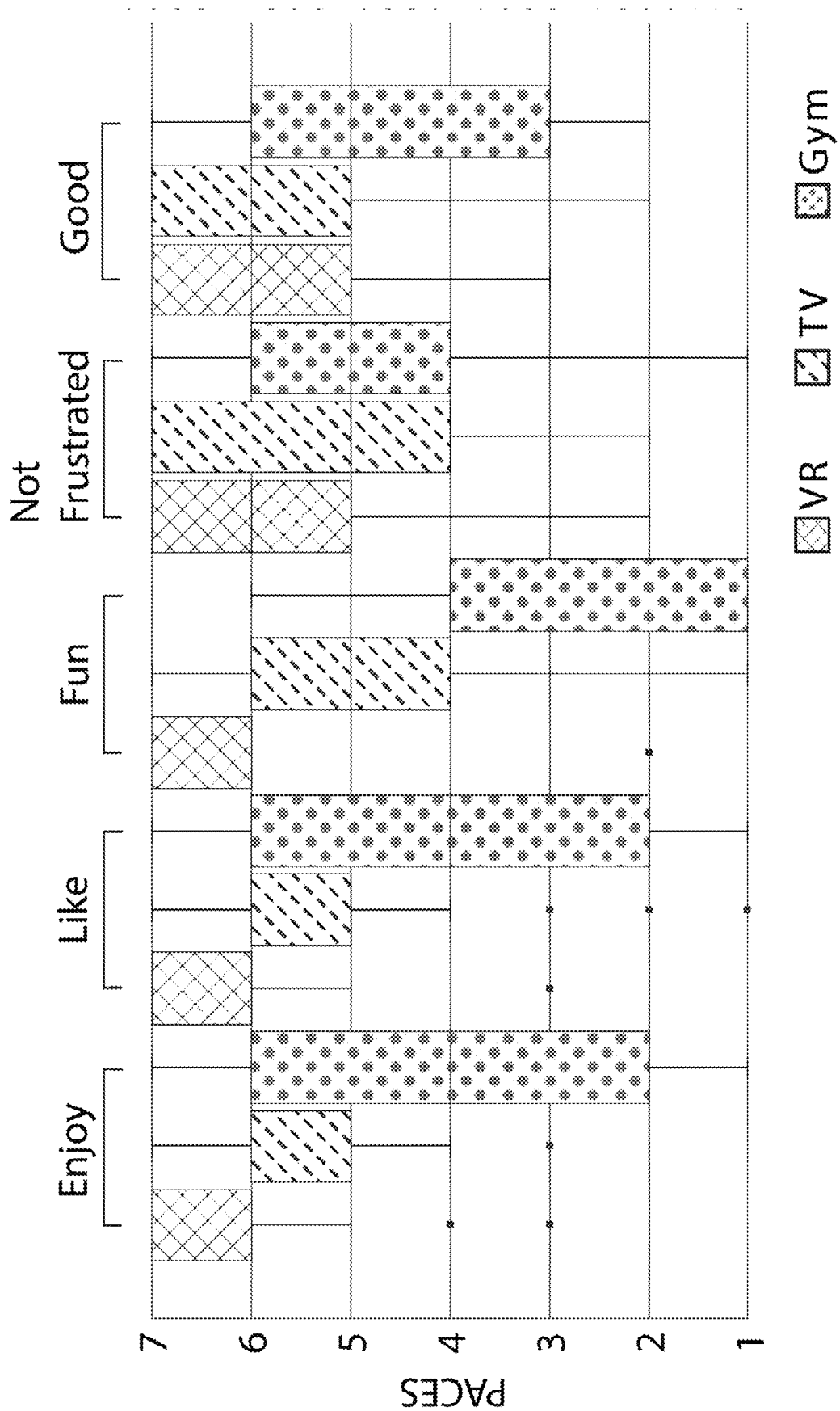
FIG. 17 depicts results of an enjoyment test for different modes, in accordance with one or more embodiments of the present disclosure.

FIG. 17 illustrates the physical activity enjoyment scale (PACES) questionnaire results. PACES is a quantitative measurement in exercise science to examine one's perceived enjoyment level of exercise activity. A modified version was used for the user evaluation.

In a Friedman test, there was a statistically significant difference in ratings about how much the participants enjoyed ($X^2$=20.84, p<0.05), had fun ($X^2$=29.86, p<0.05), liked ($X^2$=23.51, p<0.05), and felt good physically ($X^2$=17.54, p<0.05) about biking in different modes. However, there was no significant difference in the rating for the "not frustrated" question of PACES.

A post hoc analysis with Wilcoxon signed-rank tests was conducted with a Bonferroni correction applied, resulting in a significance level set at p<0.017 ($\alpha$=0.05, n=3). The medians (IQR) for the PACES questions across the VR mode, TV mode and Gym mode are shown in FIG. 17. There were no significant differences between the VR and TV modes in the rating of the "not frustrated" question of PACES (Z=−0.78, p=0.437) or in the rating of the "good" question of PACES (Z=−1.02, p=0.306); and between the Gym and VR modes in the rating of the "not frustrated" question of PACES (Z=−1.78, p=0.075). In general, there was a significant difference in the rating between each pair of exercise modes for each PACES question as Table 1 below illustrates. Based on the results, the participants generally preferred exercising in virtual reality since it was more enjoyable.

TABLE 1

Statistical parameters of PACES results for TV, VR, and Gym modes.

|  |  | Enjoy | Like | Fun | Not Frustrated | Good |
|---|---|---|---|---|---|---|
| TV-VR | Z | −3.14 | −3.12 | −3.48 | −0.78 | −1.02 |
|  | p-value | <0.017 | <0.017 | <0.017 | 0.437 | 0.306 |
| Gym-VR | Z | −3.53 | −3.41 | −3.69 | −1.78 | −2.94 |
|  | p-value | <0.017 | <0.017 | <0.017 | 0.075 | <0.017 |
| Gym-TV | Z | −3.03 | −2.27 | −3.23 | −2.23 | −3.23 |
|  | p-value | <0.017 | <0.017 | <0.017 | <0.017 | <0.017 |

To verify the exertion effectiveness of the generated paths, the Hard 15 kJ and Hard 30 kJ paths generated for the Rocky Hill as shown in FIG. 12 were used for an exertion test.

Each participant was briefed about the game control and given a warm-up session to get familiar with the game. Then the participant biked the two paths given in a randomized order. A path was completed when the participant reached the end point. There was a 5-minute break between biking the two paths.

The power meter pedal installed on the bike was used to record the power output and duration during the experiments for analysis. Before the evaluation, the power meter was calibrated. The captured data included duration in seconds, energy burned in kilojoules, average power in watts, and average cadence in round-per-minutes. The power meter was comfortable to use and did not require the participant to wear any other sensor.

Figure 18:
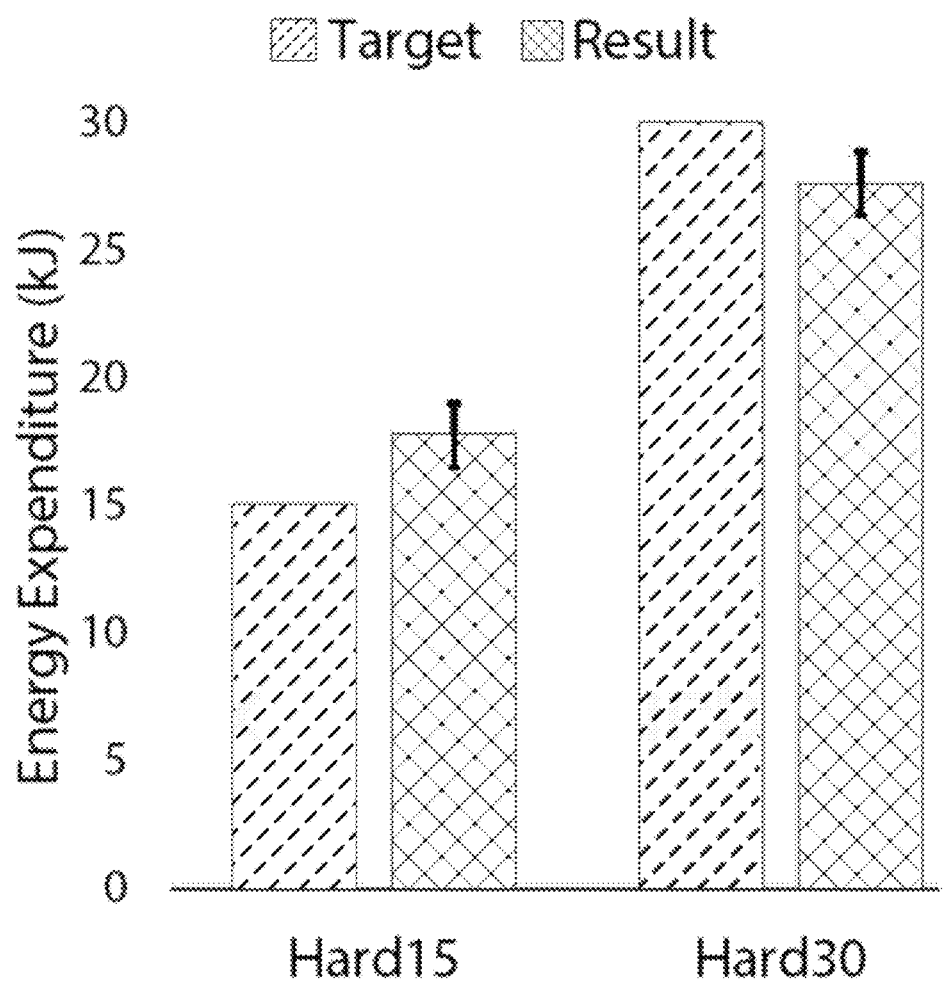
FIG. 18 depicts average energy expenditure in biking the Hard15 and Hard30 paths versus respective targets, in accordance with one or more embodiments of the present disclosure. A significant difference was found with p<0.001.

FIG. 18 compares the average energy expenditure with the total work targets specified for optimizing a first path (referred to as Hard15 simply for the sake of nomenclature) and a second path (referred to as Hard30 simply for the sake of nomenclature). Overall, the results were close to the targets. On average, the energy expenditure for the Hard15 path was 17.8 kJ and that for the Hard30 path was 27.6 kJ. Table 2 illustrates the descriptive statistics.

TABLE 2

Descriptive statistics for the Hard15 and Hard30 paths. The average completion duration, power output and energy expenditure of the participants are shown.

| Path | Average Power (watt) | Time (second) | Energy (kJ) |
|---|---|---|---|
| Hard15 | 110.4 ± 16.5 | 162.7 ± 23.3 | 17.8 ± 2.4 |
| Hard30 | 157.0 ± 23.6 | 178.1 ± 17.3 | 27.6 ± 1.6 |

The descriptive statistics on the participants' energy expenditure was examined using a paired t-test to detect whether there are differences in biking the Hard15 and Hard30 paths. A significant difference (p<0.01) was found.

Figure 19:
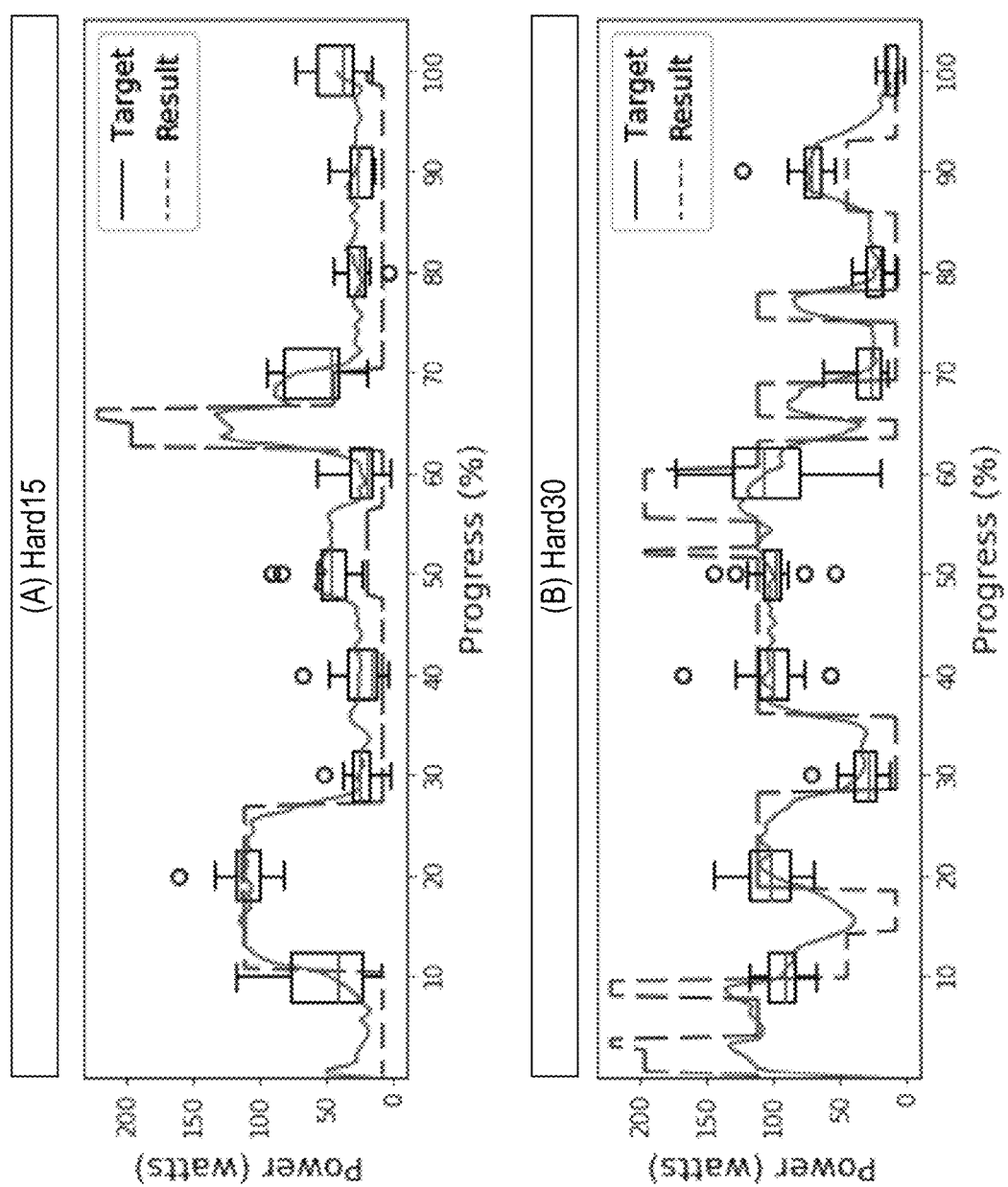
FIG. 19 depicts boxplots of the participants' power output in biking a first path (denoted by Hard15) and a second path (denoted by Hard30), in accordance with one or more embodiments of the present disclosure. Dashed line shows the average result of the 10 participants. Solid line shows the expected power output target.

To observe the participants' energy expenditure during the experiment, their power output results during the entire gameplay was compared with the expected power output targets of the generated paths. The expected feedback forces of the generated paths were converted into the expected power output targets for this comparison because the power meter measured power, not forces. As FIG. 19 illustrates, the participants' power output results follow the targets closely. Overall, the participants' energy expenditure matches the total work targets specified for optimizing the paths reasonably well, hence the generated paths help the participants achieve the exertion goals.

FIG. 20 depicts scenarios for respective terrains in which a path remained undefined after implementation of iterative optimization, in accordance with one or more embodiments of the present disclosure. Feedback force is shown as a dashed line and elevation is shown as a solid line. In some embodiments, to avoid an undefined path, the computing system 200, for example, can include an analysis subsystem that can analyze a terrain defined by input data received by the intake subsystem 210 in order to suggest one or more exertion goals that can yield a defined path. In addition, or in other embodiments, the computing system 200 also can include a terrain adaptation subsystem that can optimize the terrain concurrently with the optimization of a path on the terrain in order to generate a solution that satisfies exertion goal(s).

Figure 22:
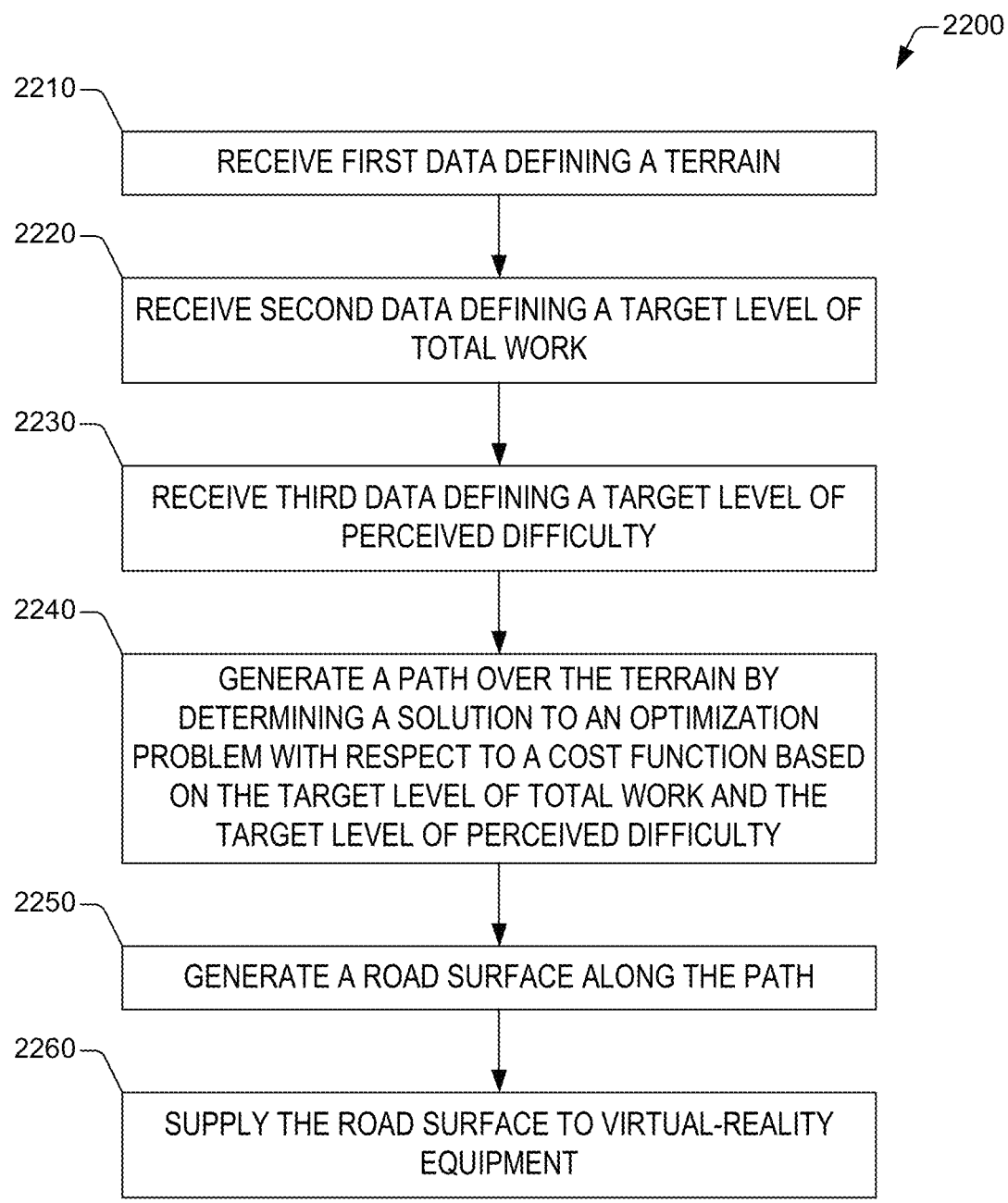
FIG. 22 depicts an example of a method, in accordance with one or more embodiments of this disclosure.

FIG. 22 depicts an example of a method 2200 for providing a road that can be used in an exergame, in accordance with one or more embodiments of this disclosure. A computing system can implement, entirely or partially, the example method 2200. The computing system can have, or can be functionally coupled to, one or more processors; one or more memory devices; other types of computing resources; a combination thereof; or the like. The computing resources can include operating systems (O/Ss); software for configuration and or control of a virtualized environment; firmware; central processing unit(s); graphics processing unit(s); virtual memory; disk space, downstream bandwidth, and/or upstream bandwidth, interface(s) (I/O interface devices, programming interface(s) (such as application programming interfaces (APIs), etc.); controller devices(s); power supplies; a combination of the foregoing; or the like. The computing system can embody, or can include, a designer computing device to generate an exergame (and exertion-aware paths) in accordance with aspects described herein.

At block 2210, the computing system can receive first data defining a terrain. As mentioned, the first data can embody an elevation mesh defining the terrain. In addition, or in some cases, the first data also can include metadata defining particular features of the terrain, such as vegetation, rock, sand, or the like, at respective points in the elevation mesh.

At block 2220, the computing system can receive second data defining a target level of total work. At block 2230, the computing system can receive third data defining a target level of perceived difficulty. The second data and the third data, individually or in combination, can define an exertion goal for the exergame or a gameplay thereof.

At block 2240, the computing system can generate a path over the terrain by determining a solution to an optimization problem with respect to a cost function based on the target level of total work and the target level of perceived difficulty. In some embodiments, the cost function also can include personalization factors based on biometric information of a user (or player). For instance, the cost function also can include calories burned as another optimization objective besides total work and/or perceived difficulty.

In some embodiments, generating the path comprises determining a solution to an optimization problem with respect to a cost function based at least on a target level of total work and a target level of perceived difficulty. The solution defines the path. As is described herein, determining the solution can include iteratively updating an initial path until a termination criterion is satisfied. Iteratively updating the initial path can be implemented in numerous ways. In some embodiments, iteratively updating the initial path can include randomly selecting, by the computing system, a particular spatial transformation from a group of spatial transformations; and updating, by the computing system, a current path by moving respective positions of a group of points on a plane according to the particular spatial transformation. The group of points can define a two-dimensional trajectory.

In addition, or in other embodiments, generating the path can include configuring, by the computing system, the updated current path as a next path using a probability based on a Metropolis criterion defined in terms of a ratio of an exponential function of the cost function evaluated at the updated current path and the exponential function evaluated at the current path.

At block 2250, the computing system can generate a road surface along the path. In some embodiments, generating the road can include embedding metadata defining position-dependent resistance forces based on a physics model, the metadata controlling haptic effects at a virtual-reality equipment. Such metadata can provide haptic feedback in virtual-reality equipment, such as a VR bike, a VR treadmill, a VR elliptic machine, a VR skiing simulator. In one embodiment, as is described herein, the stepper motor of VR bike 1100 (FIG. 11) can apply different particular feedback force levels using the metadata.

It is noted that he path can have an elevation profile along a trajectory on a plane. Thus, generating the road surface can include approximating, by the computing system, the elevation profile with a series of linear segments; and planarizing a portion of a profile of the terrain about a centerline located at position defined by a two-dimensional point in the trajectory and an elevation corresponding to the elevation profile at the two-dimensional point.

At block 2260, the computing system can supply the road surface to the virtual-reality equipment. Supplying the road surface can include, in some embodiments, sending data defining the road surface to the virtual-reality equipment. The data can be retained in a memory device within the virtual-reality equipment. In addition, or in other embodiments, supplying the road surface can include supplying such data upon generation of road surface. For instance, the virtual-reality equipment can supply that data received in block 2210, block 2220, and block 2230, and in response, the computing system can implement the remaining blocks, supplying data defining the road surface upon completion of such an implementation.

While not shown in FIG. 22, in some embodiments, the example method 2200 can include generating, by the computing system, the path further based on one or more of fourth data defining a group of positions along the path to be intersected by the path or fifth data defining a group of position along the path to be avoided by the path.

Implementation of the example method 2200, individually or in combination with other techniques of this disclosure, can provide a low-cost, computationally efficient alternative to existing exercising technologies that rely on a live coaching feature. In addition, implementation of the example method 200, individually or in combination with other techniques of this disclosure, can provide a customized exercising program with desired exertion goal(s).

Figure 23:
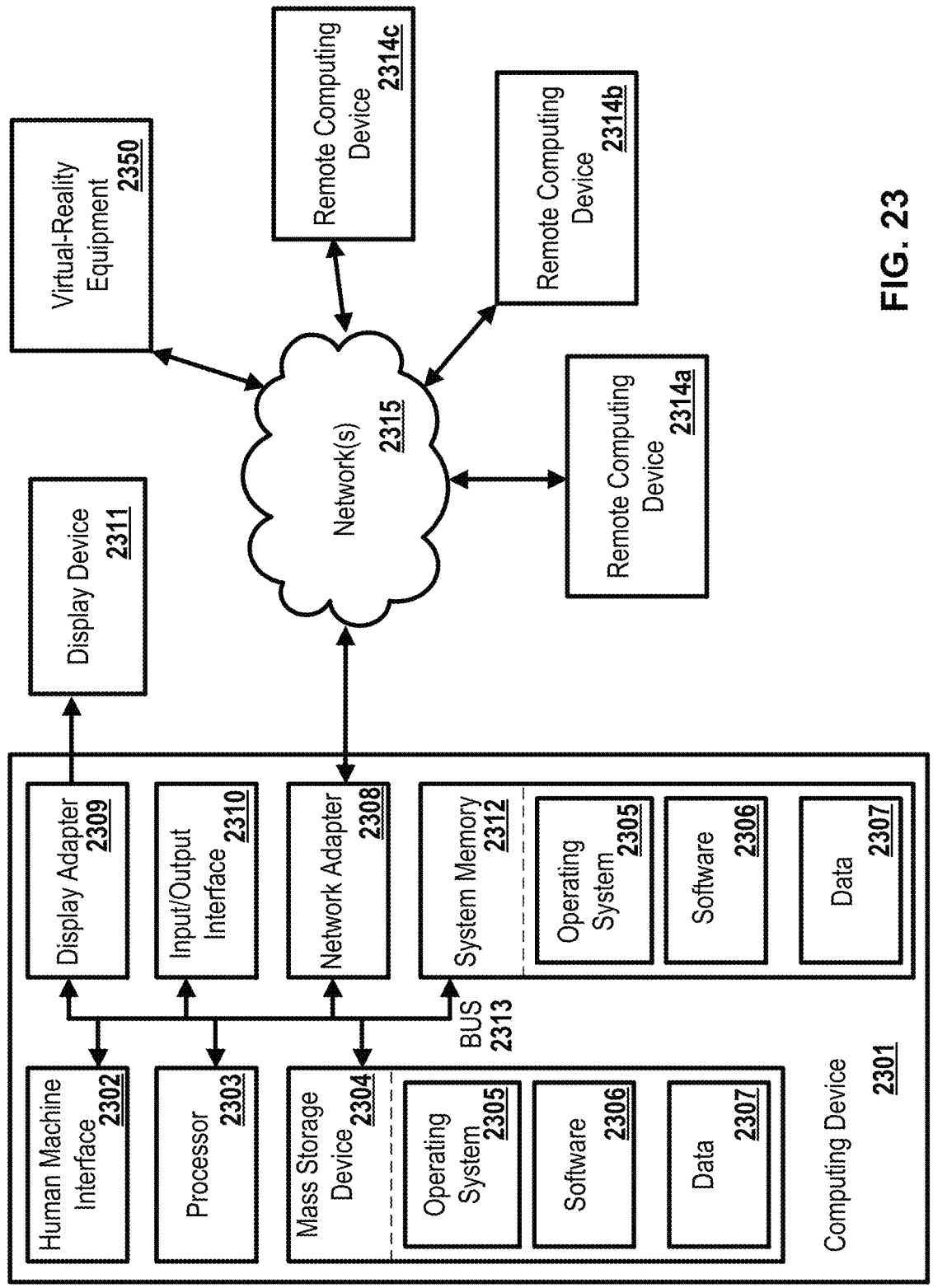
FIG. 23 is an example of an operating environment for generation and/or utilization of an exertion-aware path, in accordance with one or more embodiments of this disclosure.

In order to provide an illustration of an operating environment in which systems, techniques, and computer-program products of this disclosure can be implemented, FIG. 23 illustrates a computing device 2301 and other devices and equipment in accordance with aspects described herein. Similarly, the methods and systems disclosed can utilize one or more computers to perform one or more functions in one or more locations. The computing device 2301 can embody, in some cases, a designer computing device that can be used to generate an exergame. FIG. 23 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 2301. The components of the computing device 2301 can comprise, but are not limited to, one or more processors 2303, a system memory 2312, and a system bus 2313 that couples various system components including the one or more processors 2303 to the system memory 2312. The system can utilize parallel computing.

The system bus 2313 represents one or more of several possible types of bus structures, including a memory bus or memory controller, a peripheral bus, an accelerated graphics port, or local bus using any of a variety of bus architectures. The bus 2313, and all buses specified in this description can also be implemented over a wired or wireless network connection and each of the subsystems, including the one or more processors 2303, a mass storage device 2304, an operating system 2305, software 2306, data 2307, a network adapter 2308, the system memory 2312, an Input/Output Interface 2310, a display adapter 2309, a display device 2311, and a human-machine interface 2302, can be contained within one or more remote computing devices 2314*a,b,c* at physically separate locations, connected through buses of this form, in effect implementing a fully distributed system.

The computing device 2301 typically comprises a variety of computer-readable media. Exemplary readable media can be any available media that is accessible by the computing device 2301 and comprises, for example and not meant to be limiting, both volatile and non-volatile media, removable and non-removable media. The system memory 2312 comprises computer readable media in the form of volatile memory, such as random access memory (RAM), and/or non-volatile memory, such as read only memory (ROM). The system memory 2312 typically contains data such as the data 2307 and/or program modules such as the operating system 2305 and the software 2306 that are immediately accessible to and/or are presently operated on by the one or more processors 2303.

In another aspect, the computing device 2301 can also comprise other removable/non-removable, volatile/non-volatile computer storage media. By way of example, FIG. 23 illustrates the mass storage device 2304 which can provide non-volatile storage of computer code, computer readable instructions, data structures, program modules, and other data for the computing device 2301. For example, the mass storage device 2304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2304, including by way of example, the operating system 2305 and the software 2306. Each of the operating system 2305 and the software 2306 (or some combination thereof) can comprise elements of the programming and the software 2306. The data 2307 can also be stored on the mass storage device 2304. The data 2307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In some embodiments, the software 2306 can comprise one or more of the intake subsystem 210, the path generation subsystem 220, and the road generation subsystem 230. The data 2307 can comprise one or multiple datasets defining parameters that define one or several models, such as models 244.

In another aspect, the user can enter commands and information into the computing device 2301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 2303 via the human-machine interface 2302 that is coupled to the system bus 2313, but can be connected by other interface and bus structures, such as a parallel port, game port, an IEEE 1394 Port (also known as a Firewire port), a serial port, or a universal serial bus (USB).

In yet another aspect, the display device 2311 can also be connected to the system bus 2313 via an interface, such as the display adapter 2309. It is contemplated that the computing device 2301 can have more than one display adapter 2309 and the computing device 2301 can have more than one display device 2311. For example, the display device 2311 can be a monitor, an LCD (Liquid Crystal Display), or a projector. In addition to the display device 2311, other output peripheral devices can comprise components such as speakers (not shown) and a printer (not shown) which can be connected to the computing device 2301 via the Input/Output Interface 2310. Any operation and/or result of the methods can be output in any form to an output device. Such output can be any form of visual representation, including, but not limited to, textual, graphical, animation, audio, tactile, and the like. The display device 2311 and computing device 2301 can be part of one device, or separate devices.

The computing device 2301 can operate in a networked environment using logical connections to one or more remote computing devices 2314*a,b,c*. The computing device 2301 and, in some embodiments, at least one of the remote computing devices 2314*a,b,c* also can be functionally coupled to virtual-reality equipment 2350 via at least one network of one or more networks 2315. As an example, a remote computing device can be a personal computer, portable computer, smartphone, a server, a router, a network computer, a peer device or other common network node, and so on. The virtual-reality equipment 2350 can be a VR bike, a VR treadmill, a VR elliptical machine, a VR skiing simulator, or similar equipment. In one embodiment, the virtual-reality equipment 2350 can be embodied in, or can constitute, the VR bike illustrated in FIG. 11 and described herein before.

Logical connections between the computing device 2301 and a remote computing device 2314*a,b,c* can be made via at least one of the network(s) 2315, such as a local area network (LAN) and/or a general wide area network (WAN). Such network connections can be through the network adapter 2308. The network adapter 2308 can be implemented in both wired and wireless environments. In an aspect, one or more of the remote computing devices 2314*a,b,c* can comprise an external engine and/or an interface to the external engine.

For purposes of illustration, application programs and other executable program components such as the operating system 2305 are illustrated herein as discrete blocks, although it is recognized that such programs and components reside at various times in different storage components of the computing device 2301, and are executed by the one or more processors 2303 of the computer. An implementation of the software 2306 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "some embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms.

While techniques and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any technique (or method) set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computing system, comprising:
at least one processor; and
at least one memory device having computer-executable instructions stored thereon that, in response to execution by the at least one processor, cause the computing system to:
generate a path based at least on first data defining a terrain, second data defining a target level of total work, and third data defining a target level of perceived difficulty;
generate a road surface along the path, wherein generating the road surface includes embedding metadata defining position-dependent resistance forces based on a physics model, the metadata controlling force feedback at virtual-reality equipment; and
supply the road surface to the virtual-reality equipment.

2. The computing system of claim 1, wherein generating the path comprises determining a solution to an optimization problem with respect to a cost function based at least on the target level of total work and the target level of perceived difficulty, the solution defining the path.

3. The computing system of claim 2, wherein the determining the solution comprises iteratively updating an initial path until a termination criterion is satisfied.

4. The computing system of claim 3, wherein the iteratively updating the initial path comprises:
randomly selecting, by the computing system, a particular spatial transformation from a group of spatial transformations; and
updating, by the computing system, a current path by moving respective positions of a group of points on a plane according to the particular spatial transformation, the group of points defining a two-dimensional trajectory.

5. The computing system of claim 4, the at least one memory device having further computer-executable instructions stored thereon that, in response to execution by the at least one processor, further cause the computing system to configure the updated current path as a next path using a probability based on a Metropolis criterion defined in terms of a ratio of an exponential function of the cost function evaluated at the updated current path and the exponential function evaluated at the current path.

6. The computing system of claim 3, wherein the termination criterion dictates that an absolute change of the cost function is less than a defined percentage threshold over a defined number of past iterations.

7. The computing system of claim 1, wherein the virtual-reality equipment comprises a VR computer, a VR head-mounted device (HMD) configured to provide at least visual data, and a bike having a haptic device configured to provide haptic feedback.

8. The computing system of claim 1, wherein the path has an elevation profile along a trajectory on a plane, and wherein generating the road surface comprises:
approximating the elevation profile with a series of linear segments; and
planarizing a portion of a profile of the terrain about a centerline located at a position defined by a two-dimensional point in the trajectory and an elevation corresponding to the elevation profile at the two-dimensional point.

9. A computer-implemented method, comprising:
generating, by a computing system comprising at least one processor, a path based at least on first data defining a terrain, second data defining a target level of total work, and third data defining a target level of perceived difficulty;
generating, by the computing system, a road surface along the path, wherein generating the road surface includes embedding metadata defining position-dependent resistance forces based on a physics model, the metadata controlling force feedback at virtual-reality equipment; and
supplying, by the computing system, the road surface to the virtual-reality equipment.

10. The computer-implemented method of claim 9, wherein the generating the path comprises determining a solution to an optimization problem with respect to a cost function based at least on the target level of total work and the target level of perceived difficulty, the solution defining the path.

11. The computer-implemented method of claim 10, wherein the determining the solution comprises iteratively updating an initial path until a termination criterion is satisfied.

12. The computer-implemented method of claim 11, wherein the iteratively updating the initial path comprises:
randomly selecting, by the computing system, a particular spatial transformation from a group of spatial transformations; and
updating, by the computing system, a current path by moving respective positions of a group of points on a plane according to the particular spatial transformation, the group of points defining a two-dimensional trajectory.

13. The computer-implemented method of claim 12, further comprising configuring, by the computing system, the updated current path as a next path using a probability based on a Metropolis criterion defined in terms of a ratio of an exponential function of the cost function evaluated at the updated current path and the exponential function evaluated at the current path.

14. The computer-implemented method of claim 9, wherein the path has an elevation profile along a trajectory on a plane, and wherein the generating the road surface comprises:
approximating, by the computing system, the elevation profile with a series of linear segments; and
planarizing a portion of a profile of the terrain about a centerline located at a position defined by a two-dimensional point in the trajectory and an elevation corresponding to the elevation profile at the two-dimensional point.

15. The computer-implemented method of claim 9, further comprising generating, by the computing system, the path further based on one or more of fourth data defining a group of positions along the path to be intersected by the path or fifth data defining a group of positions along the path to be avoided by the path.

16. A computer-readable non-transitory storage medium having encoded thereon instructions that, in response to execution, cause a computing system to perform or facilitate operations comprising:
generating a path based at least on first data defining a terrain, second data defining a target level of total work, and third data defining a target level of perceived difficulty;
generating a road surface along the path, wherein generating the road surface includes embedding metadata defining position-dependent resistance forces based on a physics model, the metadata controlling force feedback at virtual-reality equipment; and supplying the road surface to virtual-reality equipment.

17. The computer-readable non-transitory medium of claim 16, wherein the generating the path comprises determining a solution to an optimization problem with respect to a cost function based at least on the target level of total work and the target level of perceived difficulty, the solution defining the path.

18. The computer-readable non-transitory medium of claim 17, wherein the determining the solution comprises iteratively updating an initial path until a termination criterion is satisfied.

19. The computer-readable non-transitory medium of claim 18, wherein the iteratively updating the initial path comprises,
- randomly selecting, by the computing system, a particular spatial transformation from a group of spatial transformations; and
- updating, by the computing system, a current path by moving respective positions of a group of points on a plane according to the particular spatial transformation, the group of points defining a two-dimensional trajectory.

20. The computer-readable non-transitory medium of claim 19, the operations further comprising configuring, by the computing system, the updated current path as a next path using a probability based on a Metropolis criterion defined in terms of a ratio of an exponential function of the cost function evaluated at the updated current path and the exponential function evaluated at the current path.

* * * * *